US006343738B1

(12) United States Patent
Ogilvie

(10) Patent No.: US 6,343,738 B1
(45) Date of Patent: Feb. 5, 2002

(54) AUTOMATIC BROKER TOOLS AND TECHNIQUES

(76) Inventor: John W. L. Ogilvie, 1211 E. Yale Ave., Salt Lake City, UT (US) 84105

( * ) Notice: Subject to any disclaimer, the term of this patent is extended or adjusted under 35 U.S.C. 154(b) by 0 days.

(21) Appl. No.: 09/552,341

(22) Filed: Apr. 18, 2000

Related U.S. Application Data

(60) Provisional application No. 60/134,383, filed on May 15, 1999.

(51) Int. Cl.[7] .................................................. G06F 7/08
(52) U.S. Cl. ........................ 235/381; 235/380; 705/26
(58) Field of Search ................................ 235/379, 381, 235/494, 480, 375, 382, 382.5, 454, 371; 705/26, 1, 27, 37, 75, 77, 80, 2, 7; 902/1, 8, 30, 41; 379/144, 112, 113

(56) References Cited

U.S. PATENT DOCUMENTS

| | | | |
|---|---|---|---|
| 5,426,281 A | | 6/1995 | Abecassis .................... 235/379 |
| 5,428,778 A | | 6/1995 | Brookes ...................... 395/600 |
| 5,557,518 A | * | 9/1996 | Rosen ......................... 364/408 |
| 5,613,004 A | | 3/1997 | Cooperman et al. .......... 380/28 |
| 5,687,236 A | | 11/1997 | Moskowitz et al. .......... 380/28 |
| 5,732,400 A | | 3/1998 | Mandler et al. .............. 705/26 |
| 5,794,207 A | | 8/1998 | Walker et al. ................. 705/23 |
| 5,802,497 A | | 9/1998 | Manasse ...................... 705/27 |
| 5,822,737 A | * | 10/1998 | Ogram ........................ 235/381 |
| 5,826,244 A | | 10/1998 | Huberman ................... 705/37 |
| 5,862,223 A | | 1/1999 | Walker et al. ................. 380/25 |
| 5,875,110 A | * | 2/1999 | Jacobs ......................... 235/381 |
| 5,897,620 A | | 4/1999 | Walker et al. ................. 705/5 |
| 5,900,608 A | * | 5/1999 | Lida ............................. 235/381 |
| 5,913,203 A | * | 6/1999 | Wong et al. .................. 705/39 |
| 5,932,863 A | * | 8/1999 | Rathus et al. ................. 235/381 |
| 5,933,498 A | | 8/1999 | Schneck et al. ............... 380/4 |

(List continued on next page.)

FOREIGN PATENT DOCUMENTS

| | | | |
|---|---|---|---|
| JP | 9-179556 | * | 9/1997 |
| WO | 00-70516 | * | 11/2000 |

OTHER PUBLICATIONS

PCT Search Report for PCT/US00/10376, Sep. 7, 2000.
PCT/US98/23841, Ogilvie, published Sep. 23, 1999.
Steganography Info and Archive, pp. 1–7, no later than Dec. 17, 1998.
PixelTag, pp. 1–2, Dec. 14, 1998.
Four Atypical Uses for Escrow, pp. 1–3, 1995.
EscrowTech, pp. 1–14, no later than Jun. 11, 1999.
ebay pages, pp. 1–42, no later than May 10, 1999.
priceline.com pages, pp. 1–6, no later than May 15, 1999.
tradesafe.com pages, pp. 1–14, no later than Apr. 12, 2000.
"For Dueling Lawyers, the Internet is Unlikely Referee", Wall Street Journal, B1, May 12, 1999.
cyber$ettle.com pages, pp. 1–4, no later than May 15, 1999.
"Settling Disputes Online", New York Law Journal, Apr. 19, 1999.
ECEC Auction, pp. 1–3, no later than May 15, 1999.
Sporting Images, pp. 1–3, No later than May 15, 1999.

(List continued on next page.)

*Primary Examiner*—Thien M. Le
(74) *Attorney, Agent, or Firm*—Computer Law++

(57) ABSTRACT

The invention provides sampling, escrowing, and other tools and techniques for facilitating transactions that involve digital goods. Transactions may be of the goods-for-payment type, or they may be barter transactions that exchange goods for goods. Digital goods may be escrowed with an automatic broker. The broker may also create and distribute samples of the goods, which are created by techniques such as distorting or burdening part or all of a copy of the goods. In some cases the broker may accept and act on approval or disapproval notices from the parties to a transaction, to cancel or complete a transaction. In other cases, the broker's participation is limited to providing and/or authenticating samples.

35 Claims, 6 Drawing Sheets

U.S. PATENT DOCUMENTS

| | | | | |
|---|---|---|---|---|
| 5,949,885 A | | 9/1999 | Leighton | 380/54 |
| 5,953,226 A | * | 9/1999 | Mellish et al. | 364/147 |
| 5,995,947 A | | 11/1999 | Fraser et al. | 705/38 |
| 5,999,937 A | * | 12/1999 | Ellard | 707/101 |
| 6,029,146 A | | 2/2000 | Hawkins et al. | 705/35 |
| 6,085,168 A | * | 7/2000 | Mori et al. | 705/17 |
| 6,087,847 A | * | 7/2000 | Mooney et al. | 326/30 |
| 6,119,229 A | * | 9/2000 | Martinez et al. | 713/200 |
| 6,209,787 B1 | * | 4/2001 | Lida | 235/381 |
| 6,236,972 B1 | * | 5/2001 | Shekdy | 705/1 |
| 6,282,658 B2 | * | 8/2001 | French et al. | 713/201 |

OTHER PUBLICATIONS hsbcgroup.com pages, pp. 1–7, no later than May 15, 1999.
Electronic Banking Systems, pp. 1–8, no later than May 15, 1999.
"Puts Money in Your Pocket", one page, May 16, 1999.
Information Broker Research Service, pp. 1–3, no later than May 15, 1999.
Facts On Call, Inc., pp. 1–5, Aug. 5, 1998.
Warrick & Asociates, pp. 1–6, no later than May 15, 1999.
REAL Research, pp. 1–3, no later than May 15, 1999.
windh software, pp. 1–3, no later than Apr. 12, 2000.
triscan.com pages, pp. 1–3, no later than Apr. 12, 2000.
Aridi, one page, no date.
How to Use, pp. 1–2, no later than May 15, 1999.
Tim Boyle Photo, one page, no later than May 15, 1999.
Circular 61: Copyright Registration for Computer Programs, U.S. Copyright Office, September 1995.
PowerQuest WebStore, pp. 1–2, no later than Apr. 11, 2000.
Digiscents, one page, no later than Apr. 8, 2000.
Data Junction, pp. 1–8, no later than Nov. 4, 1999.
Shredder 2.0, pp. 1–7, no later than Sep. 22, 1998.
The Handbook of Artificial Intelligence, pp. 281–287, 1981.
Alta Vista, pp. 1–2, no later than Mar. 26, 2000.
amazon.com pages, pp. 1–2, no later than Mar. 26, 2000.
Patent Cafe's Patent Mart, pp. 1–6, no later than Mar. 26, 2000.
IBM Intellectual Property Network, pp. 1–18, no later than Mar. 26, 2000.
PatentAuction.com, pp. 1–8, no later than Mar. 26, 2000.
pl–x.com pages, pp. 1–5, no later than Mar. 26, 2000.
"Technology Becomes Auction Market's New Draw", Wall Street Journal, B13A, Jan. 24, 2000.
"Honeywell, P&G and Other Large Firms Offer Their Intellectual Property Online", Wall Street Journal, B6, Feb. 28, 2000, with attached pp. 2–8 from yet2.com.
Libes, Obfuscated C and Other Mysteries, pp. 13–23, 47–61, no later than 1993.
barter–n–trade.com pages, pp. 1–13, no later than Apr. 13, 2000.
North American Barter Exchange, pp. 1–14, no later than Apr. 13, 2000.
Warez Exchange, pp. 1–6, no later than Apr. 15, 2000.

* cited by examiner

AUTOMATIC BROKER TOOLS AND TECHNIQUES

RELATED APPLICATIONS

This application claims priority to, and incorporates by reference, commonly owned copending U.S. Patent Application No. 60/134,383 filed May 15, 1999.

FIELD OF THE INVENTION

The present invention relates to the technical goal of providing prospective buyers and sellers of digital content with information and assurances, and relates more particularly to sampling, escrow, and barter tools and techniques for an automated broker to facilitate a market in digital content.

TECHNICAL BACKGROUND OF THE INVENTION

Advances in computer technology have created an enormous body of digital content, namely, content stored as bits in some computer-readable medium. Some categories of digital content have widely used non-digital counterparts. For instance, books are still more widely available in paper form than in digital form. Other categories of digital content exist primarily or solely in response to the widespread use of digital computers; examples include databases and software. Some categories of digital content exist primarily to entertain. Others reflect research, development, or marketing efforts. Regardless of such distinctions, one result of the computer revolution is a growing body of valuable artistic, technical, business, academic, and other content stored in various digital formats.

Another result of the computer revolution is relatively easy communication of digital content. The Internet (including the World Wide Web), email, "instant messaging" services, "chat rooms", news groups, electronic discussion forums and bulletin boards, and other computer-aided avenues of communication are now available in many parts of the world. One might expect these communication tools to support a thriving market in the growing body of digital content. Indeed, much digital content is advertised, purchased, and/or delivered through the Internet and other computer-assisted communication tools.

For example, demonstration versions of computer software can be downloaded by prospective users without any direct human action, once the software owner selects the software version and places a copy of the selected software on a web site, FTP site, or other electronically accessible location. Full-function versions can also be paid for and then obtained through commercial transactions that require little or no direct human action, other than having the seller initially provide a master copy of the software and having each buyer provide payment information such as a credit card number. Shareware software can similarly be downloaded using computer programs as intermediaries, rather than relying on a human sales clerk. In short, online software shops are well-known.

Moreover, transactions involving goods other than software can also be performed using software sales "personnel". Auction sites such as www.ebay.com facilitate transactions involving software and many other types of goods, both digital and non-digital. Reverse auction or "demand collection" sites such as www.priceline.com facilitate transactions involving both goods and services.

These and/or other "e-commerce" sites offer prospective buyers and competing sellers information about goods and services of virtually every type, and many sites also allow one to purchase goods and/or services on-line. To give just a few examples, web sites exist to advertise and/or sell patent rights, games, software, books, mortgage services, oil and gas properties, medical supplies, scientific equipment, factory simulation services, insurance services, computers, management consulting services, investment banking services, and "adult" content and services. Sellers' sites generally provide textual descriptions of the goods and/or services being offered, and many offerings also include images and/or sounds that represent or constitute the offered goods and/or services. The images may be still images, video clips such as those in MPEG or AVI format, or user-navigable images such as those in the IPIX format.

The images sometimes include samples in the form of partial images or thumbnail images. These samples are apparently selected by the seller and/or approved by the seller for posting based on the seller's understanding of the techniques used to create the samples. That is, the seller apparently knows what prospective buyers will see when they view the samples. If the goods are digital images, these samples may be presented with the promise that complete and/or larger images are available to be downloaded in exchange for payment. Similarly, video and/or audio clips showing part of a work may be presented to encourage purchase of a copy of the complete work.

Despite the enormous amount of activity in electronic commerce, problems remain. One factor that makes the market in digital content risky is the ease with which most digital content can be copied. Of course, many efforts have been made to reduce unauthorized use of digital content. For instance, copyright laws, other intellectual property laws, encryption that prevents use of a product without user registration and/or payment, other technical measures, and the basic honesty of many people, can each provide some protection against the theft of digital content.

But a content owner may still be justifiably reluctant to make that content available for inspection by prospective buyers, lest the content be copied and used without paying the owner. On the other hand, buyers may quite reasonably want to inspect the digital content before they pay for it. Unless the buyer and the seller have a working relationship based on successful completion of earlier transactions, or trust each other for some other reason, the lack of trust can prevent successful completion of the transaction even when such completion would benefit both parties.

To help illustrate the issues of trust involved in a transaction between a seller and a buyer, we define some notation. This notation, or similar notation, may have been used previously but the notation itself is not the invention. Rather, the notation is used in this Technical Background to describe prior approaches to marketplaces in digital content, and it is also used in later sections to describe the present invention, just as English (or another language) can be used for both purposes. That is, the fact that the notation is used in discussing both past approaches and the present invention does not mean that the invention described with that notation was previously known.

Naming the initial participants and items involved is straightforward: we use "S" to denote a seller, "B" for a buyer, "G" for the goods or services being sold, and "$" for payment (understanding that other currencies than U.S. dollars may also be used).

If all goes well a seller S transfers goods G to a buyer B and receives payment $ as compensation. But the order of events in the transaction can be very important, so the notation also describes different orders. When S hands B the goods and then receives the payment, in that order, the steps in this transaction may be represented as:

S-G->B; S<-$-B.

Diagrams or other notation could also be used; the notation above has the advantage of not requiring special characters or any drawing (graphics) facility. If the seller first receives payment and only then turns over the goods to B, the transaction may be represented as:

S<-$-B; S-G->B or as:

S<-$-B
S-G->B

If we do not know or do not care about the order (either act may occur first, or they may partially or completely overlap each other), then the transaction is shown as:

(S-G->B || S<-$-B)

or, equivalently, as:

(S<-$-B || S-G->B)

Finally, if the two acts must overlap in time, we write:

(S-G->B && S<-$-B)

or, equivalently:

(S<-$-B && S-G->B).

A single "|" means "or" in the sense of one act or another act or both acts being done. A single "&" means "and" in the sense of both acts being done.

S and B will often negotiate before exchanging goods and payment, with one or more offers, counteroffers, conditions, and/or acceptances before goods and payment are exchanged. Such negotiations are written as:

S<-N->B

The "N" stands for "negotiation(s)" and the arrow is bidirectional to indicate the back-and-forth nature of most negotiations.

The seller S will often provide (and/or the buyer B will require) a description and/or a sample of the goods. These events can be represented (and annotated with comments) like this:

S-DM->B //description and sample
S-D->B //description only
S-M->B //sample only

The sample M is a conventional sample, that is, it is obtained using tools and techniques which are known in the art and it is provided in the context of conventional commercial transactions. As explained later, the present invention provides novel samples, samples which are obtained by novel tools and/or techniques, and/or samples which are used in the novel context provided by the invention.

If a step is optional, we precede it by "?". For instance, if the seller's provision of a sample can be either present or omitted without substantially altering the trust (or other) issues being discussed, but negotiation is essential, we could write:

(S<-N->B || ?(S-M->B)); (S-G->B || S<-$-B)

The notation could be made even more complex, borrowing ideas from areas like computer programming, logical calculus, and multiprocessing, but the notation is not the goal. Understanding and improving transactions is the goal. We will use the notation and/or Figures hereafter.

Consider some trust issues, which may depend on the order of events in a transaction. For instance, consider transaction T1, which is illustrated in FIG. 1 and described by the notation as follows:

1. ?(S-D->B) || ?(S-M->B)
2. S<-$-B
3. S-G->B

If the description and/or sample provided in step (1) are faulty, then the payment in step (2) may be too high. For instance, the quality of the goods may be lower than the sample led the buyer to expect. Even if any description and/or sample provided in step (1) are accurate, seller S may "take the money and run", so the desired step (3) doesn't occur as buyer B expected. Buyer B is forced to trust that descriptions and/or samples provided by seller S accurately represent the goods G, and buyer B is also forced to trust that seller S will not disappear after being paid, leaving buyer B without the goods G for which B paid.

An alternative is transaction T2, which is illustrated in FIG. 2 and described by the notation as follows:

1. ?(S-D->B) || ?(S-M->B)
2. S-G->B
3. S<-$-B

This approach forces seller S to trust that buyer B will not simply take the goods and fail to make payment in the desired step (3).

Another alternative is transaction T3:

1. ?(S-D->B) || ?(S-M->B)
2. S-G->B && S<-$-B

That is, the seller and the buyer each hand the other the goods and the payment, respectively, at essentially the same time. This may be good in theory, but it is difficult in practice. Each must trust the other not to outwit or overpower them and then leave with both the goods and the payment, leaving one party empty-handed. To succeed reliably, T3 requires matching levels of trust and power, which are relatively rare when one looks at the wide range of parties that could mutually benefit from completing a transaction with each other.

Each of these transactions can be improved somewhat by having each party learn more about the other through negotiations, using transactional approaches such as those which are illustrated in FIG. 3 and summarized in the following notation:

Transaction T1N:

1. ?(S-D->B) || ?(S-M->B)
2. S<-N->B
3. S<-$-B
4. S-G->B

Transaction T2N:

1. ?(S-D->B) || ?(S-M->B)
2. S<-N->B
3. S-G->B
4. S<-$-B

Transaction T3N:

1. ?(S-D->B) || ?(S-M->B)
2. S<-N->B
3. S-G->B && S<-$-B

But trust issues remain. In T1N, B might not receive accurate samples and descriptions, and B might not receive the goods or services after paying for them. In T2N, S might not receive payment after providing the goods or services. In T3N, each party may be at risk of being outwitted or overpowered by the other.

Another set of alternatives use a conventional agent A such as a broker, attorney, banker, or other "trusted third party" who is trusted by virtue of being neutral, bonded, licensed, and/or regulated, for example. The agent A is a human, or an institution directly operated and controlled by humans. One transaction T4 involving seller S, buyer B, agent A, goods or services G, payment $, and approvals OK is illustrated generally in FIG. 4. Time advances as one moves from the top of the Figure toward the bottom. In the notation we have been using, the transaction T4 goes something like this:

1. ?(S-D->B) ∥ ?(S-M->B)
2. ?(S<-N->B) // could also precede step (n), or precede and follow, or overlap
3. A<-$-B // agent A receives money from buyer; A "holds" or "escrows" the $
4. S<-OK-A // A confirms to S that A has the payment
5. S-G->B
6. S<-OK-B ∥ A<-OK-B // B OK's the goods and OK's payment completion
7. S<-$-A // A releases the funds to S However, agent A must be trusted by both seller S and buyer B. A must be trusted by B, lest A leaves with the payment after step (3). B must also trust A to perform step (7) when, and only when, approval is given to A by B in step (6). A must be trusted by S, lest A leaves with the payment after step (3), or receives the payment but denies receiving it (no step (4)). There are other ways for the transaction to go wrong if trust is undeserved (such as partial payments or damaged goods or faulty timing), but these suffice for now.

Another transaction T5 involving an agent goes like this:

1. ?(S-D->B) ∥ ?(S-M->B)
2. ?(S<-N->B) // could also precede (n), or precede and follow, or overlap
3. (A<-$-B ∥ S-G->A) // agent receives money from buyer and goods from seller
4. (A-OK->B ∥ S<-OK-A) // agent confirms goods & payment OK and in hand
5. (A-G->B ∥ S<-$-A) // agent releases goods to buyer & payment to seller Again, agent A must be trustworthy and trusted. Otherwise, for instance, A could improperly retain possession of both the goods and the money after step (3). A could also intentionally misrepresent the amount, quality, or receipt of the goods, and/or the amount, quality, or receipt of the payment in step (4). A could also release an item (goods or payment) to one party but not release the other item in step (5) if A improperly favors one party unbeknownst (at least beforehand) to the other.

In short, conventional approaches to commercial transactions pose significant risks to buyers and sellers. These risks are increased by the ease with which digital goods can be copied once they are made available for inspection. The need for trust is also increased by the fact that the Internet and other communications media make it more likely than ever that a prospective buyer and prospective seller do not have a history of successfully concluded transactions (at least not with each other), and that they may well be separated by long geographic distances, by different natural languages, by different national laws, and/or by cultural differences.

Accordingly, it would be an advance to provide tools and techniques which make it easier for prospective buyers to inspect digital goods without thereby creating a significant risk that those goods will be copied, and hence stolen, by someone who is merely posing as a buyer.

More generally, it would also be an advance to improve the market for digital content by providing tools and techniques which reduce and/or meet the need for the parties in a transaction to trust each other.

Such tools and techniques are disclosed and claimed herein.

BRIEF SUMMARY OF THE INVENTION

The present invention relates to methods, articles, signals, and systems for facilitating electronic commerce in digital goods. Examples of digital goods include musical works, visual works, and other artistic works in digital form; patent applications, engineering documents, CAD files, and other technical information in digital form; software; mailing lists, customer databases, and other marketing information in digital form; intellectual property rights in patents, copyrights, trademarks, trade secrets, and/or technical or marketing know-how; and other information in digital form that does or may possess commercial value. The invention facilitates commerce in such goods by reducing or eliminating barriers by providing an improved basis for the parties to expect successful completion of the desired transaction.

In a transaction according to one embodiment of the invention, each of the two or more parties to a transaction provides an inventive automatic broker with (a) the ability to deliver some item of value to one or more of the other parties, such as goods or payment, and (b) conditional authorization to deliver that item. Each party then reviews information from the other party or parties (often sent by way of the broker) and approves or cancels completion of the transaction. If the parties approve completion, then the broker effects the transfers. Otherwise, the broker returns the digital items of value, releases its hold on them, and/or deletes them, such that the broker no longer has the ability to deliver the items.

Unlike some conventional approaches to transactions, all brokering functions can be provided automatically. This reduces cost, increases transaction throughput, and reduces the opportunity for transactions to fail due to mistakes or bad acts by a broker.

In particular, digital goods can be escrowed with an automatic broker by providing the broker with a copy to be stored on a medium accessible only to the broker (or at least not reasonably accessible to the party that provided the goods to be escrowed). Goods could also be escrowed on a medium that is accessible to the party that provided the goods, by encrypting them and/or digitally signing them so any changes made after they are provided to the broker can be prevented or can at least be detected by the broker and/or the buyer. However, placing copies at a location not known to the seller and/or not accessible to the seller is preferred, since preventing the seller from retrieving all copies of the escrowed goods will significantly reduce the risk that the seller will prevent a buyer from receiving the goods after paying (or bartering) for them.

Payments, such as credit card holds, bank transfers, digital cash, and the like, can also be escrowed by the broker. In transactions that exchange goods for goods (i.e., barter transactions) rather than exchanging goods for payment, all of the digital goods can be held in escrow by the broker pending authorization from the parties to complete the transaction, after which the goods are released by providing copies to the parties, as previously specified by the parties. Note that "payment" is used herein to mean cash, currency, or similar liquid payment, as opposed to goods or services.

The automatic broker can generate samples of digital goods, to be provided by the broker to a prospective buyer. Samples can also be provided to the seller, but this is not always necessary or appropriate. In some embodiments, the seller does not know what technique will be used to generate the sample, so the seller is discouraged from providing goods that will pass inspection only if a particular sampling technique is used. The sampling techniques preferably permit the buyer to inspect the goods without thereby making the goods available for use by the buyer without purchase. Samples can also be provided in a catalog, to be browsed by specified or unspecified parties. For instance, a catalog might be open to general access within a company, or open to the public at large. Other aspects and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

Figure 1:
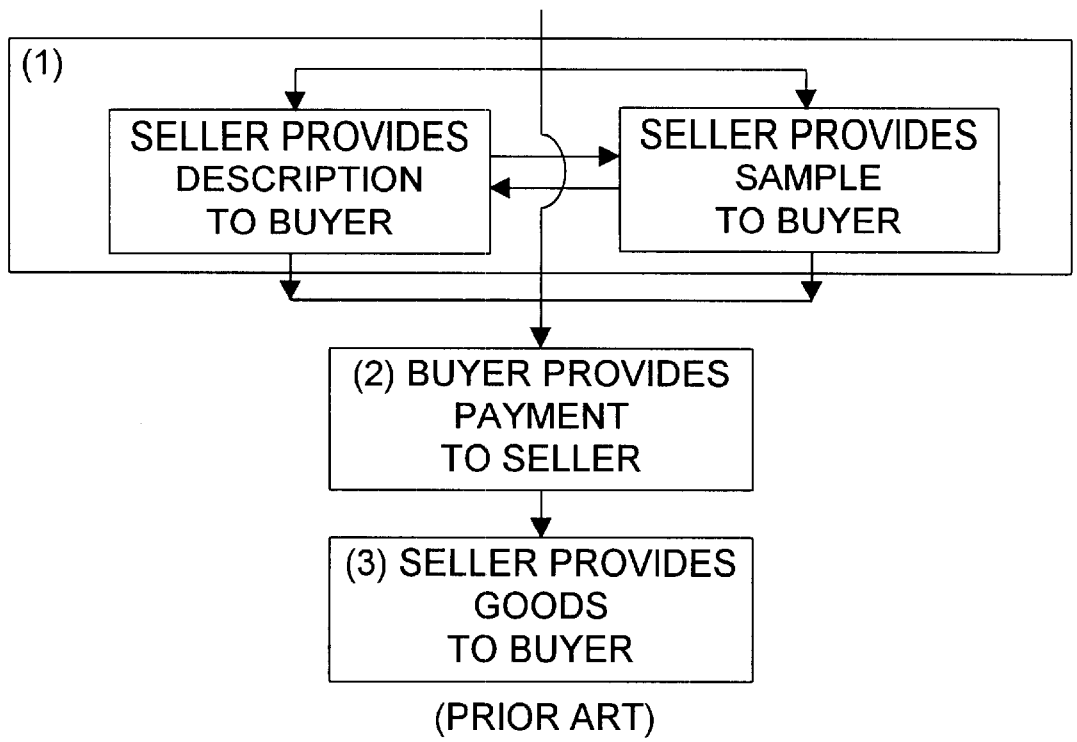
FIG. 1 is a flowchart illustrating a prior art approach to transactions involving digital and/or non-digital goods, in which the buyer provides payment and the seller then provides the goods in response.
Figure 2:
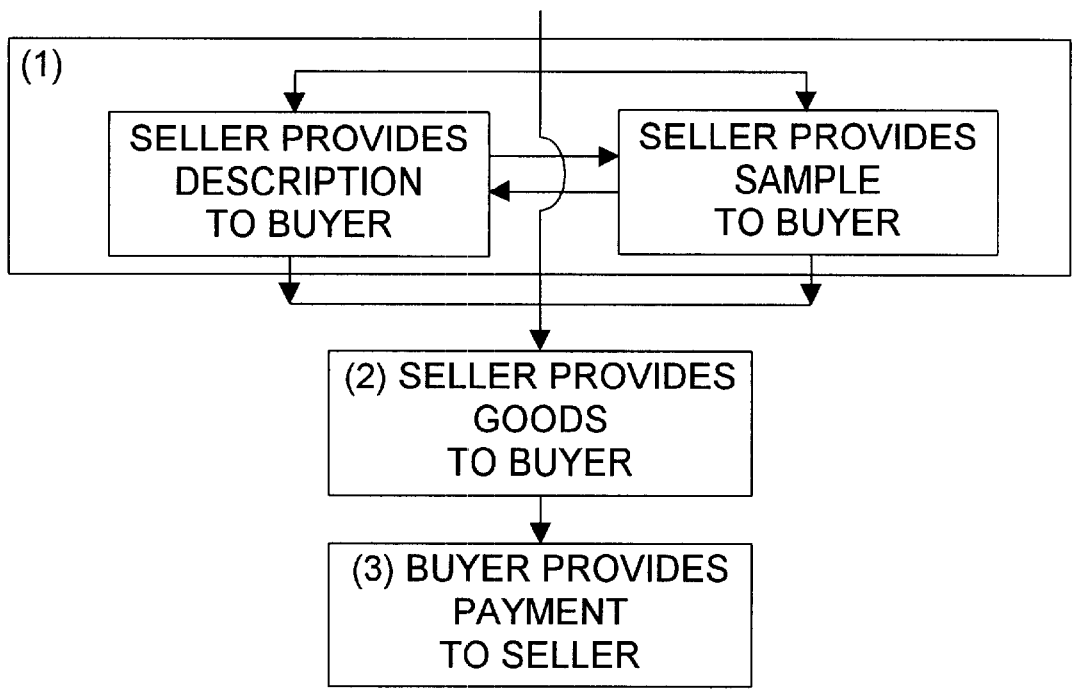
FIG. 2 is a flowchart illustrating a prior art approach to transactions involving digital and/or non-digital goods, in which the seller provides the goods and the buyer then provides the payment in response.

In describing methods, devices, signals, programs, products, and systems according to the invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, here in the Detailed Description and/or elsewhere in the application file.

In particular, an "embodiment" of the invention may be a system, an article of manufacture, a method, the product of a process, and/or a signal which configures a computer random access memory, disk, CD, DVD, or other computer-readable media 1110. In jurisdictions which permit it, such as some European jurisdictions, an embodiment may also be a computer program, provided it meets the novelty, inventiveness/nonobviousness, and other legal requirements of the jurisdiction.

For convenience, reference is also made to sellers and buyers as "human parties" or "humans" to distinguish them from the automatic broker of the invention. But a buyer and/or seller may be any legal person, such as an individual, corporation, limited liability company, foundation, partnership, French "S.A.", German "GmbH", etc. Also, the broker is presumably programmed, built, or otherwise created and/or maintained by people according to teachings herein. Operation of the broker may be overseen by human administrators and driven by data and/or commands from human users. The broker may also be property of an individual, corporation, or other legal person.

Networks, Computers, Software, Infrastructure

Suitable networks for configuration and/or use as described here include one or more local area networks, wide area networks, metropolitan area networks, and/or "Internet" or IP networks such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer may function both as a client and as a server. Each network includes at least two computers such as the server and/or clients. A computer may be a workstation, laptop computer, disconnectable mobile computer, server, mainframe, cluster, so-called "network computer" or "thin client", personal digital assistant or other hand-held computing device, "smart" consumer electronics device or appliance, or a combination thereof.

Each computer includes at least a processor and a memory; computers may also include various input devices and/or output devices. The processor may include a general purpose device such as a 80x86, Pentium (mark of Intel), 680x0, or other "off-the-shelf" microprocessor. The processor may include a special purpose processing device such as an ASIC, PAL, PLA, PLD, Field Programmable Gate Array, or other customized or programmable device. The memory may include static RAM, dynamic RAM, flash memory, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network may include communications or networking software such as the software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

At least one of the computers is capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein. Thus, the medium 1110 tangibly embodies a program, functions, and/or instructions that are executable by computer(s) 1100, 1102, and/or 1104 to provide samples, escrow goods for bartering or for cash purchases, complete transactions, and/or otherwise help facilitate transactions in digital and/or other goods or services substantially as described herein. Likewise, the "wires" and other data carriers and hard drives and memory may embody signals for facilitating transactions in digital and/or other goods or services substantially as described herein.

Suitable software to assist in implementing the invention is readily provided by those of skill in the pertinent art(s) using the teachings presented here and programming languages and tools such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Much of the infrastructure that can be used according to the present invention is already available, such as: general purpose computers; computer programming tools and techniques; computer networks and networking technologies; digital storage media; authentication, access control, and other security tools and techniques provided by public keys, encryption, firewalls, and/or other means; bank transfers, credit card processing, digital money, and other tools and techniques for making payments. Such existing technologies are not claimed by themselves. However, the present invention uses existing infrastructure in new ways and adds incremental improvements to that infrastructure.

Overview

Figure 4:
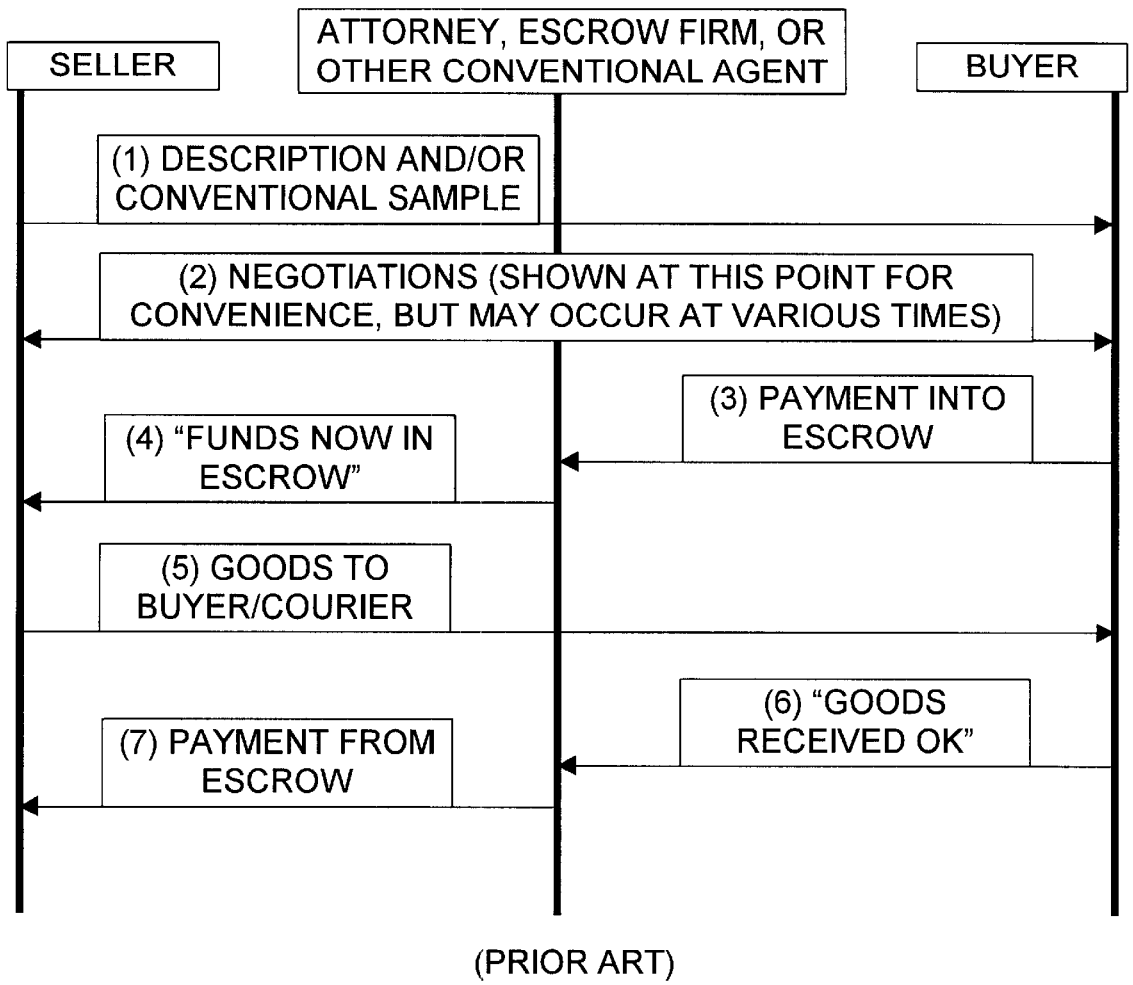
FIG. 4 is a data flow diagram illustrating a prior art approach to transactions involving digital and/or non-digital goods, in which a conventional agent acts as an intermediary between the seller and the buyer.
Figure 5:
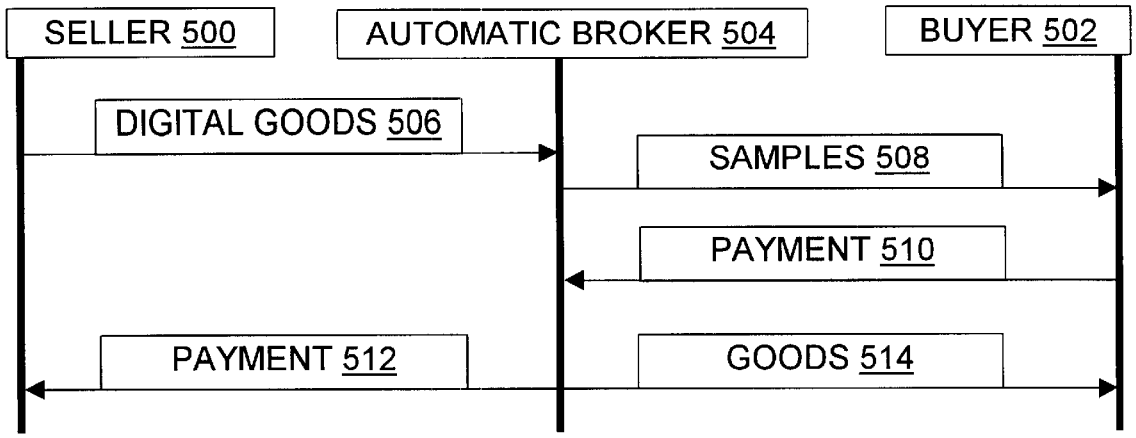
FIG. 5 is a data flow diagram illustrating embodiments of the present invention with transactions involving at least some digital content, in which a novel automatic broker acts as an intermediary between the seller and the buyer, the broker receives the digital content from the seller, the broker provides samples based on that digital content to the buyer, and the broker completes the transaction by releasing payment to the seller and releasing the digital content to the buyer.

The inventive approach shown in FIG. 5 does bear some resemblance to the conventional approach shown in FIG. 4. As in FIG. 4, the transaction is between at least one seller 500 and at least one buyer 502, and if all goes well then the seller receives payment and the buyer receives goods.

However, in any given embodiment of the invention, there are one or more significant differences between the invention, on the one hand, and conventional tools or techniques on the other hand. These differences may include the parties participating, the goods involved, the samples involved, the path taken by the goods, the path taken by the payment, and the type and level of trust required. Although they are related and may be combined in inventive embodiments, we consider each of these in turn below.

For clarity of illustration, negotiations between parties are not shown in FIG. 5 or subsequent Figures, but it should be understood that such negotiations may occur at zero or more points during a given transaction according to the present invention. Also, transactions according to the invention may involve more than one buyer and/or more than one seller; for clarity of illustration, only a single seller 500 and a single buyer 502 are shown in the Figures.

Parties

One difference between the conventional approach illustrated in FIG. 4 and the inventive approach shown in FIG. 5 is the presence of an automatic broker 504. The automatic broker 504 is identified in the priority application Serial No. 60/134,383 as "Q", and is identified herein as "Q", "the broker", "broker 504", "automatic broker", etc. In some embodiments, the automatic broker 504 supplements or replaces the conventional agent A discussed in the Technical Background section above by escrowing goods, completing transactions, and so on. As indicated in FIG. 4, conventional agent A is an attorney, escrow firm, or other person or institution known before the present invention. In other embodiments, the broker 504 is used by an agent A or another transaction party to generate samples.

The automatic broker Q may be implemented as an automatic impartial broker in computer hardware and/or software according to the invention. For instance, Q may be embodied in novel software running on general-purpose hardware. Q could also involve novel hardware. The invention is not limited to Q but also includes related signals, and methods using Q such as business methods for transacting digital content sales. Q's impartiality is preferably reasonably protected through encryption, certification, anti-virus protection, and like measures, to prevent intervention by untrustworthy parties. Untrustworthy parties are those who would unfairly take advantage of others' trust in Q. For instance, an untrustworthy party might try to take unfair advantage of others' reliance on the assumption that Q will complete the transaction if and only if the buyer(s) and the seller(s) expressly advise Q of their consent to such completion.

When properly implemented, the automatic broker Q is not subject to temptation. Thus, if the broker Q is programmed by persons having trustworthy intent and adequate technical skills, Q will be impartial in the sense that it may be entrusted with transaction facilitation tasks with fewer trust-related risks than in some conventional approaches.

Goods

In a conventional transaction like that shown in FIG. 4, the goods are not necessarily digital. By contrast, transactions with the automatic broker 504 involve at least some digital goods 506; non-digital goods may or may not also be involved. In some embodiments, the goods 506 are digital in the sense that they include digital content such as bits, files, databases, etc. which are placed in escrow with the broker 504, to be released by the broker 504 as part of transaction completion. In some embodiments, the goods 506 are digital in the sense that their digital content serves as an original (i.e., an initial copy) from which the broker 504 creates samples 508 as discussed herein.

In some transactions, the digital goods 506 are the only goods that are subject to the transaction at hand. In other transactions, rights in non-digital goods may also be transferred, as when a seller provides both a digital technical description of some chemical composition, and physical pieces of that composition for spectrographic or other physical inspection. Of course, other non-digital goods may be treated similarly, as when samples are extracted or test data is provided on alloys, minerals, agricultural products, and so on.

In some transactions, the digital goods 506 represent or replicate non-digital goods. For instance, the digital goods could include seismic records indicating the nature and extent of petrochemical deposits; satellite images; or instrument readings or traces, including, for instance, output from medical imaging devices such as CAT or NMR scans, from chemical analysis tools such as gas spectrometers, from physics instruments such as electron microscopes, or from other instruments whose data can be checked by the buyer for internal consistency and whose data provide the buyer with pertinent information about the physical goods.

Samples

Conventional transactions involve no samples at all, or involve samples of conventional types. Conventionally, samples are provided by sellers in the form of physical pieces of the goods, as when part of a fluid good is siphoned off to be tested, or when one free pen or other specimen of a mass produced item is provided to encourage purchase of additional copies. Conventional samples of software are often provided in the form of "demo" software which runs but has only a subset of the functions of the regular product and/or has a built-in limit on the duration of use and/or the total number of uses. Although catalog descriptions and images are not the same as samples of the described and depicted items, conventional catalog entries are used to convey product information and encourage purchase, which are also common goals when providing demo versions, specimens, or other conventional samples.

By contrast, samples 508 are provided by the broker 504. Unlike transactions in which the seller provides the sample directly to the buyer or provides the agent A with the sample to be given to buyers, in some embodiments of the invention the seller 500 does not directly generate the sample 508. Instead, the automatic broker 504 generates the sample. Indeed, in some transactions, the seller 500 never receives a copy of the sample 508 from the broker 504.

In addition, embodiments of the invention permit samples 508 to be more than "siphoned off" specimens. Content for a sample 508 may be extracted from the content of the goods 506, but the extraction can be performed in various ways, and it may depend on the type of digital good 506 involved. Content for a sample 508 may also be obtained by other techniques, such as by distorting or enhancing the content of the goods 506.

Path of the Goods and the Payment

In some conventional transactions, like those illustrated in FIG. 4, goods are shipped directly from the seller to the buyer. This may be done in transactions according to the present invention. However, digital goods 506 can also be escrowed with the automatic broker 504, to be released automatically to the buyer 502 after payment is made.

Likewise, in conventional transactions payment may be sent directly from the buyer to the seller. This may also be done in transactions according to the present invention. However, a digital payment 510 can also be escrowed with the automatic broker 504, to be released automatically to the seller 500 after the goods 506 are provided.

In particular, FIG. 5 illustrates an embodiment of the invention in which neither the goods nor the payment are provided directly by one of the human parties to the other. Instead, the goods 506 and the payment 510 are each escrowed with the automatic broker 504. Only after it receives both the goods 506 and the payment 510 does the broker 504 release them to the other party (by sending 512 the payment to the seller 500 and sending 514 a copy of the digital goods 506 to the buyer 502). This approach requires the seller 500 and the buyer 502 to each trust the automatic broker 504, rather than asking them to trust each other. For instance, the seller 500 need not worry that the buyer 502 will receive a useable copy of the goods 506 without the seller 500 being paid, and the buyer 502 need not worry that the seller 500 will receive payment without the buyer 502 receiving a useable copy of the goods 506.

Trust Issues

As noted, some embodiments of the invention shift the trust required from trust in the other party to trust in the automatic broker. This may facilitate transactions that would otherwise not occur. When properly implemented and administered, the automatic broker is preferably an impartial entity. That is, the broker's behavior does not unfairly favor any human party over any other human party in the transaction.

Moreover, people may perceive the automatic broker as more trustworthy than human agents, because machines are usually not subject to human emotions such as greed, fear, or hatred that sometimes skew transactions between people. This does not mean a severely mechanistic interface, such as a sequence of forms, would necessarily be best. People sometimes reveal confidences or otherwise place trust in programs that mimic people, such as the ELIZA program, so a natural language interface could also be used in embodiments of the automatic broker.

A legally binding confidentiality or non-disclosure agreement is used in some embodiments of the invention, to assure sellers that the buyer will not disclose confidential sample contents, for instance. Unlike conventional transactions, however, the invention provides a way for prospective buyers to inspect digital goods without necessarily obtaining a complete and useable copy of those goods.

Instead, the samples 508 permit sellers to provide buyers with enough information to permit inspections of quality and/or extent without forcing sellers to rely solely on legal means (e.g. contract or copyright law) or business ethics to prevent buyers from unauthorized use of easily reproduced digital goods. This encourages sellers to make goods available for inspection, which facilitates transactions. Some embodiments of the invention also remove the selection of samples 508 from the control of the seller. This encourages buyers to rely on the samples as accurate guides to the content of the digital goods 506, which also facilitates transactions. In short, the invention reduces or eliminates questions of trust which inhibit transactions in digital content.

FIG. 5 is not comprehensive. To further illustrate the invention, we now consider some additional examples, using both the notation introduced earlier and additional Figures. The Figures and the notational examples do not necessarily correspond precisely with each other as representations of the invention. That is, the Figures illustrate inventive embodiments or aspects thereof which are not called out expressly in the notation examples, and vice versa. Also, some embodiments of the present invention mix elements which are set forth in the Figures with elements set forth in the notational examples.

Additional Goods-for-Payment Transactions

Figure 6:
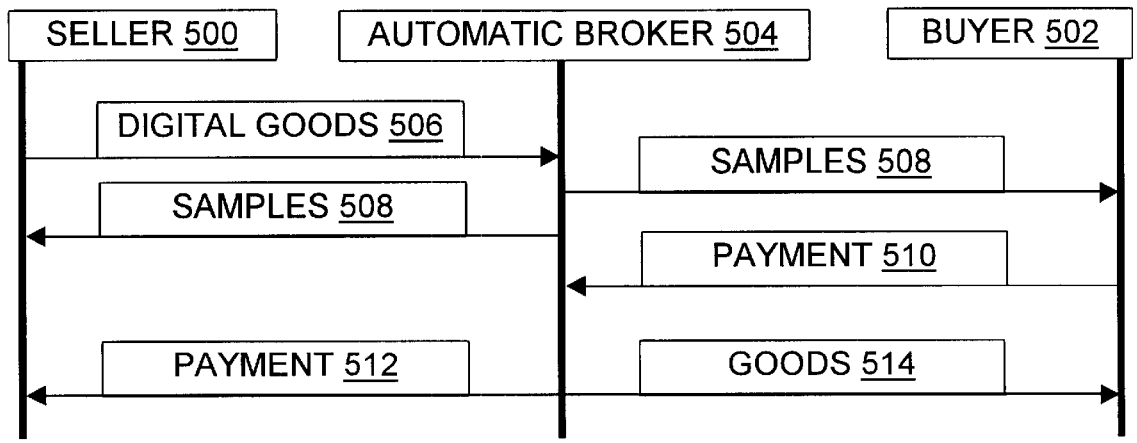
FIG. 6 is a data flow diagram illustrating embodiments of the present invention with transactions similar to those illustrated in FIG. 5, in which the novel broker also provides the seller with at least one sample which is being provided to the buyer to permit evaluation of the seller's digital content.

FIG. 6 illustrates an embodiment similar to that shown in FIG. 5, with the addition of a step transmitting the samples 508 to the seller. That is, in this embodiment the seller 500 receives a copy of the samples that are created by the broker 504 and then provided by the broker 504 to the buyer 502 for inspection.

By contrast, the seller in FIG. 5 only obtains a copy of the samples 508 if the buyer sends it one. The seller does not provide the samples to the broker 504 for forwarding (the broker creates the samples), and the broker 504 does not provide the seller with a copy of the samples the broker creates.

In conventional approaches, a seller of digital goods has the opportunity to inspect copy of the samples that the buyer receives, either because the seller creates the samples itself or because the seller knows in advance what techniques will be used to create the samples. For instance, a seller of images may itself conventionally create thumbnail samples, or the seller may conventionally use software tools which will create thumbnail samples on the seller's behalf using techniques whose details are not necessarily understood by the seller but whose results are readily predicted by the seller.

In the embodiment shown in FIG. 6, by contrast, the broker 504 creates the samples 508 using techniques whose results are not necessarily known ahead of time to the seller 500. Because the seller 500 cannot easily predict what algorithms will be used to create the samples from the goods 506 provided to the broker 504 by the seller, the invention can make it difficult or impossible for the seller to trick the broker into sending the buyer 502 samples that are not accurate guides to the nature and extent of the digital goods.

The samples 508 may be provided to the seller for one or more purposes. For instance, the techniques used to create the samples may be challenged by the seller, in which case the buyer and seller may agree that the broker should produce a second (or third, fourth, etc.) sample using a different technique. Note that the broker 504 preferably uses a subsequent sampling technique which produces a subsequent sample that cannot be combined with the previous sample(s) to obtain a complete and useable copy of the goods. Sampling should allow inspection without permitting full use of the goods.

Figure 7:
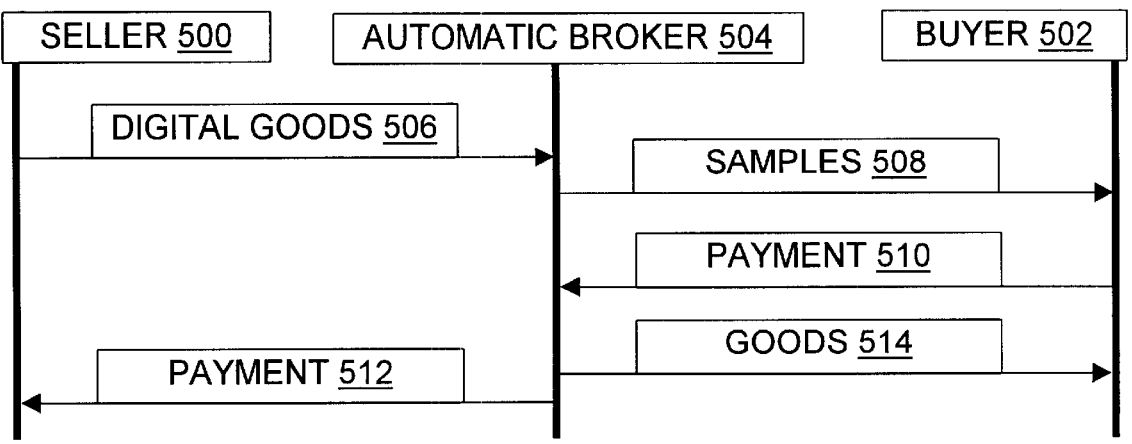
FIG. 7 is a data flow diagram illustrating embodiments of the present invention with transactions similar to those illustrated in FIG. 5, in which the novel broker completes the transaction by releasing payment to the seller and releasing the digital content to the buyer at different times, despite the risk that the later release will be prevented after the first release is underway or completed.

FIG. 7 illustrates embodiments in which the automatic broker 504 releases 514 the goods at a substantially different time than it releases 512 the payment. In FIG. 7, the goods 506 are released before the payment 510, but other embodiments similarly release the payment 510 before releasing the goods 506. Either approach creates a risk that the broker 504 will be unable to complete the transaction. For instance, the broker 504 or the network might be attacked after the payment 510 has been transmitted but before the goods 506 are transmitted. Nonetheless, releasing the payment 510 and the goods 506 at different times may be desired for convenience, by mutual agreement of the parties, to take advantage of network bandwidth (goods will generally be larger than payments, in terms of bandwidth required for transmission), and/or for other reasons.

Barter Transactions

Figure 8:
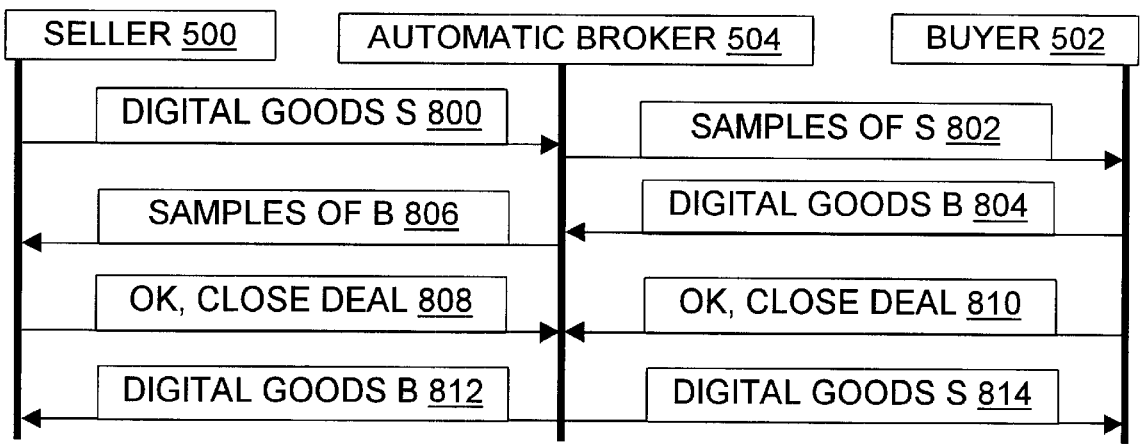
FIG. 8 is a data flow diagram illustrating embodiments of the present invention with transactions in which the seller and the buyer each provide digital content to be released to the other after their approval is given to the novel broker.

FIG. 8 illustrates barter embodiments in which the buyer and seller each provide the other with digital goods, as opposed to situations in which the seller provides digital goods and the buyer provides digital cash or similar liquid payment. The seller places 800 its digital goods in escrow with the broker 504, which obtains samples thereof and then sends 802 the samples to the buyer. Likewise, the buyer places 804 its digital goods in escrow with the broker 504, which obtains samples that it sends 806 to the seller. At this point, the broker 504 has the digital content that was submitted by each party 500, 502, and each party 500, 502 has samples of the other's digital content. The samples were preferably produced by techniques not chosen by the parties, but selected instead by the broker 504, so that each party can rely on the samples as representative of the goods being proposed by the other party for the exchange.

If each party 500, 502 is satisfied with the other's goods, as represented by the sample it received from the broker 504, then each party gives its approval to the broker 504. The broker 504 then completes the transaction by releasing 812, 814 each party's goods to the other party.

If either party is unsatisfied with the samples or wishes to cancel the deal for some other reason, it can withhold its approval, and the transaction will time out without being completed. Alternately, a party can expressly cancel the transaction. In either case, the broker deletes the escrowed goods. The broker 504 may also overwrite the hard disk, RAM, and/or other memory that held the parties' digital content, using an electronic "shredding" algorithm such as that employed by various known products for military and other security purposes.

Barter transactions are also illustrated in the following method for facilitating barter transactions involving digital content, the digital content provided by at least two parties, the method comprising the steps of:

receiving from a first party a copy of first digital content and escrowing that first digital content;

receiving from a second party a copy of second digital content and escrowing that second digital content;

determining an approval exists to release the first digital content to the second party;

determining an approval exists to release the second digital content to the first party;

releasing the first digital content to the second party; and releasing the second digital content to the first party.

In some embodiments, at least one of the determining steps comprises receiving an approval from the party that provided the digital content being approved for release. In others, lack of disapproval is taken as approval, so at least one of the determining steps comprises timing out after no cancellation is received from the party that provided the digital content being approved for release.

In some embodiments the method further comprises the steps of creating a sample of digital content, and sending the sample to at least one of the parties prior to at least one of the determining steps. If the digital content includes an image, for instance, then the step of creating a sample could create a thumbnail of the image. Thus, the exchange may be based on an inspection by one or more parties of samples taken from the goods proposed by other parties for exchange.

More generally, in these and other transactions according to the invention each party provides the other with components in the form of liquid payment, digital goods, non-digital goods, and/or legally binding promises, in varying mixtures, including mixtures that omit one or more such components. To give just two of the many possible examples, rather than exchanging payment for goods, the parties could exchange goods for goods (per FIG. 8), or they could exchange payment for a time-limited option on the goods. That is, a "sale" of digital goods includes a lease, or an exchange for other goods or services, or legal promises, or liquid payment. This makes the terms "buyer" and "seller" broader than would otherwise be the case, since a "buyer" may receive payment and a "seller" may receive goods, but the terms are convenient so we use them nonetheless. Also, barter transactions may provide payment as well as goods, and payment transactions may provide goods as well as payment.

Samples vs. Transactions

Figure 9:
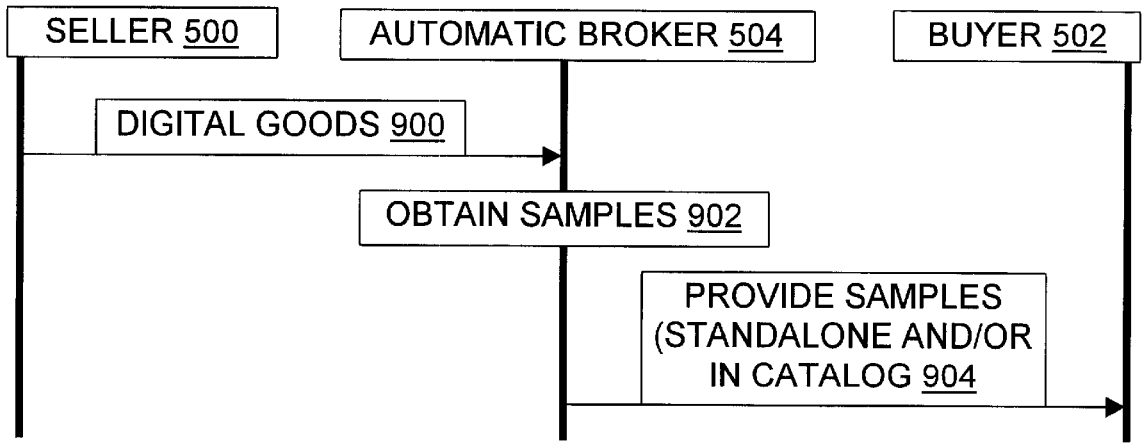
FIG. 9 is a data flow diagram illustrating embodiments of the present invention with transactions in which the novel broker is used primarily or solely to provide samples of digital content, and hence does not necessarily participate in the transaction by releasing payment or by releasing goods.

FIG. 9 illustrates embodiments of the invention which facilitate transactions but do not necessarily include any particular transaction completion. In these situations the seller 500 does not necessarily know the identity of the prospective buyer 502. Indeed, in some cases, the seller does not even know whether there presently are any prospective buyers. Rather, these embodiments employ the novel sampling aspects of the invention to make samples available at web sites, FTP sites, bulletin boards, and/or other locations that are accessible to some population that may include one or more buyers.

That is, the seller 500 provides 900 a copy of its digital content to the broker 504. The broker 504 then obtains 902 one or more samples, by using extraction, distortion, enhancement, or a combination thereof on the provided digital content, as taught herein. Then the broker provides 904 the samples by placing copies of them on the web site, FTP site, and/or bulletin board to permit access by prospective buyers 502.

In one alternative, the seller uses the broker 504 to obtain the samples and does not necessarily rely on the broker to complete the transaction by transmission of goods from the broker 504 to the buyer 502. Indeed, in some embodiments, the goods are not retained by the broker 504, but are instead made available to the broker 504 by the seller 500 merely to permit the broker to create the samples, which the broker 504 then gives to the seller. The seller 500 then proceeds as it sees fit, such as by requesting that the broker create different samples using different techniques, and/or by providing the samples directly to a prospective buyer rather than going through the broker 504 to pursue or complete a transaction.

Additional Transaction Examples

Turning now from the Figures back to the notational examples, consider the following transaction T4Q involving seller S, buyer B, and the novel computerized element Q 504 in generally the position taken earlier by the human agent A. This transaction was described in the priority application No. 60/134,383 and is repeated here for completeness and convenience:

1. ?(S-D->B) ∥ ?(S-M->B)
2. ?(S<-N->B) // could also precede (n), or precede and follow, or overlap
3. Q<-$-B // novel software receives money from buyer and holds or escrows it
4. S<-OK-Q // software Q confirms to S that Q has payment
5. S-G->B
6. S<-OK-B ∥ Q<-OK-B // B OK's goods and OK's payment completion
7. S<-$-Q // Q releases finds to S When properly programmed and operating, Q can be trusted by buyer B not to abscond with the payment $ after step (3). B can also trust Q to perform step (7) when, and only when, approval is given to Q by B in step (6). Likewise, Q can be trusted by S not to take the payment and disappear after step (3), and can likewise be trusted not to deny receiving the payment (no step (4)).

A variation T4Q' involves transferring the goods to Q and then releasing them; the trust issue analysis is similar to that above for T4N:

1. ?(S-D->B) ∥ ?(S-M->B)
2. ?(S<-N->B) // could also precede (n), or precede and follow, or overlap
3. S-G->Q // novel software receives goods from seller and holds or escrows them
4. Q-OK->B // software Q confirms to B that Q has goods
5. S<-$-B
6. S-OK->Q ∥ S-OK->B // S OK's payment and OK's goods transfer to B
7. Q-G->B // Q releases goods to B Note that Q could "have" the goods and/or "release" the goods either by having proof in digital form from a bank or government agency or highly trusted third party that the goods are under Q's control, or by having physical oversight of the goods when the goods are digital in nature. That is, Q could know the storage location of the digital goods and have control (through encryption, access control lists, firewalls, groups, permissions, tokens, and/or other familiar access control tools and techniques) of those digital contents.

A transaction T5Q involving novel automatic broker Q goes like this:

1. ?(S-D->B) ∥ ?(S-M->B)
2. ?(S<-N->B) // could also precede (n), or precede and follow, or overlap
3. (Q<-$-B ∥ S-G->Q) // broker receives money from buyer and goods from seller
4. (Q-OK->B ∥ S<-OK-Q) // broker confirms goods & payment OK and in hand
5. (Q-G->B ∥ S<-$-Q) // broker releases goods to buyer & payment to seller Again, Q can be both trustworthy and trusted if properly implemented. Q would not intentionally retain illegal possession of both the goods and the money after step (3). Q would not intentionally misrepresent the amount or quality or receipt of the goods and/or money in step (4). Q would not intentionally defraud a party by releasing an item (goods or payment) to one party without releasing the corresponding item to the other party in step (5). Q would be programmed to be impartial, and programmed to protect that impartiality from being overridden, regardless of whether S, B, or some third party is behind the override effort.

Impartiality of software in the context of a business exchange has been recognized as valuable, at least implicitly, by the creators of the cyber$ettle.com web site. The software available through that site accepts settlement offers, holds them confidential, compares them, and announces a settlement if they fall within a predetermined distance of each other. However, cyber$ettle.com apparently does not broker transactions between buyers and sellers of goods, much less between buyers and sellers of digital goods. It is also believed by the inventor that cyber$ettle.com does not teach the present invention's tools and techniques for obtaining and/or using samples of digital content.

In addition to the broker, the seller(s), and the buyer(s), a transaction according to the invention may include other entities. For instance, A transaction T7 uses both Q and a third party financial institution F, such as an electronic banking facility:

1. ?(S-D->B)
2. ?(S<-N->B) // could also precede (n), or precede and follow, or overlap
3. S-G->Q
4. Q-X->B || ?(S<-X-Q) // S might get X so S knows basis for B's view of G
5. ?(S<-N->B) // parties might renegotiate after B views X
6. (F<-$-B) // B will pay this much for G based on sample X
7. (Q<-OK->F) // Q verifies funds transfer from B with F; Q OK's F paying S
8. (Q-G->B || S<-$-F) // broker releases goods to buyer & F pays seller Note that in any or all of the various transactions using Q and/or X, the parties S and B might prefer to remain anonymous (subject to any applicable legal requirements). Anonymous remailers, anonymous funds transfers, anonymous logins, and/or email aliases could be used. This anonymity reduces the risk of being overpowered by the other party, such as the risk in transaction T3. It may also promote transactions between parties that would otherwise not deal with each other for historic reasons that have little or nothing to do with the particular goods in question.

Note that Q (and Q with F) can reduce trust issues in transactions, but cannot entirely eliminate them. For instance, in some contexts, knowledge of the number of copies of the digital content may be important. However, the inventive tools and techniques cannot guarantee that the copy of digital goods G sold to B is unique. S may have retained a copy and/or sold another copy to some other buyer B'.

Digital and Other Goods

Suitable digital content and/or digital goods include executable software; software source code; email and other mailing lists; databases of various types and formats, such as relational, object-oriented, or hierarchical databases; CAD files; scanned documents; word processor or spreadsheet documents; web pages; scripts; digital or digitized photographs, video, sounds; multimedia presentations; patent applications, design documents, and other scientific and technical information in computerized form; multimedia presentations and courses; digital images (still, user-navigable 360-degree, and video); digital sounds; digital movies and other entertainment content; and a wide variety of other digital content. The collection of suitable digital content may well grow over time. For instance, in addition to sounds and images, it is also apparently possible to digitally encode smells. One could thus expect efforts to digitally encode tastes, if such efforts are not already underway.

The digital content may be in plain form, or the user or other entities or agents (e.g., system software) may have encrypted and/or compressed the digital content. The result of encrypting and/or compressing digital content is still digital content.

Securities, stocks, bonds, futures, notes, mortgages, and such financial instruments are not "digital goods." However, one or more such items may serve as "payment" in an embodiment of the invention that requires a payment.

As used herein, "digital" includes both content that was originally generated in digital form and content that was converted (e.g., digitized) into a digital form from a non-digital form via scanning, conventional sampling, and/or another process.

The terms "digital content" and "digital goods" are equivalent, at least from the perspective of obtaining samples, releasing content, and similar operations performed by the broker 504. Using both terms provides a more accurate impression of the invention's scope. Using "digital goods" alone might give the mistaken impression that works of art or scientific research cannot be exchanged according to the present invention, while using "digital content" alone might give the mistaken impression that only works from so-called "content providers" can be thus exchanged.

Obtaining and Using Samples

When the goods involved are digital, the automatic broker Q can reduce risks arising from descriptions and/or samples that are not representative of the actual goods. The term "sample" has special meaning when used in reference to certain embodiments of the present invention, namely, those in which the sample is characterized in that its content is not predicted by the seller, whereby the sample contains useful information about the digital content without containing a complete and accurate copy of the digital content. In other embodiments, "sample" may refer to conventional samples (obtained by conventional techniques such as creating a thumbnail of an image or quoting an excerpt from a text) or "sample" may refer to samples obtained by novel techniques like those described herein.

Figure 10:
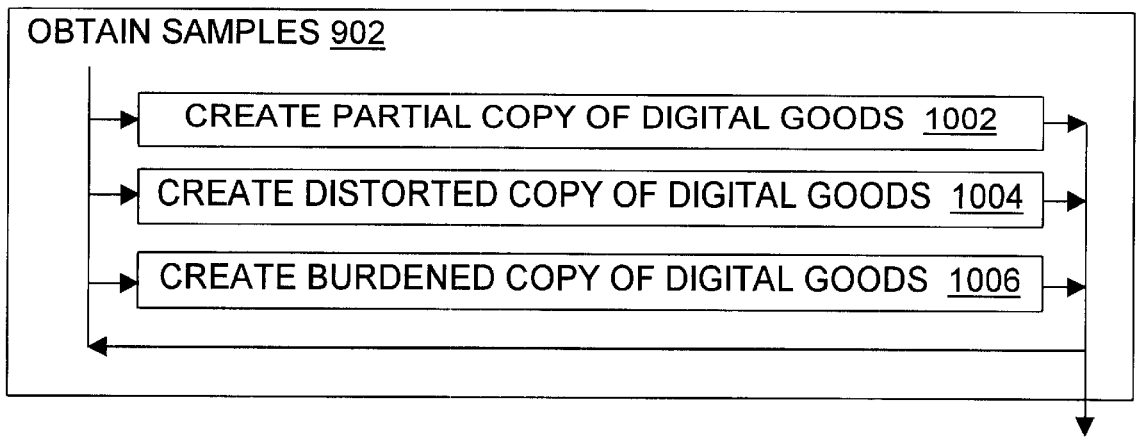
FIG. 10 is a flowchart further illustrating techniques which may be used in the novel broker, separately or in combination, to provide buyers and/or sellers with samples of digital content.

As illustrated in FIG. 10, with respect to the invention, sampling techniques 902 include selecting 1002 a subset of existing data, distorting 1004 data, and/or enhancing 1006 a data set. That is, a novel sample X may be created by selecting content from digital goods 900 in a previously unknown way, by distorting content from digital goods 900, and/or by adding specified content to digital goods 900. As noted, the digital goods 900 may be supplied to the broker 504 by one or more sellers and/or buyers. A transaction involving the samples may be completed by the broker 504 as intermediary, or it may be completed by the parties without further use of the broker 504 once the broker provides the sample(s).

Note that conventional sampling by selecting a portion of non-digital goods is well-known in conventional transactions. Embodiments of the present invention provide novel samples, novel transactional uses of samples extracted from digital data by conventional techniques, and/or novel techniques for obtaining samples from digital goods. For instance, conventional tools and techniques for string manipulation, search/replace, numerical calculations, flow control, lookup tables, bit-shifting, user-defined functions, and callable DLLs may be used according to the present invention to create samples whose content is not predicted by a seller and is therefore less subject to manipulation by the seller.

To illustrate the use of samples, consider the transaction T6Q described by the notation below. A sample X is extracted from the digital goods by the broker Q in a manner which is not necessarily known beforehand by seller S and which is selected to make the sample X a poor or worthless substitute for the sampled goods G themselves:

1. ?(S-D->B)
2. ?(S<-N->B) // could also precede (n), or precede and follow, or overlap
3. S-G->Q
4. Q-X->B || ?(S<-X-Q) // S might get X so S knows basis for B's view of G
5. ?(S<-N->B) // parties might renegotiate after B views X 6. (Q<-$-B) // B will pay this much for G based on sample X 7. (Q-G->B || S<-$-Q) // broker releases goods to buyer & payment to seller The tools and techniques used to extract samples such as X may vary. For instance, if digital content includes an email list in ASCII text, a sample could contain every fourth character (or Nth character, with a small N>1). This partial copy allows a buyer to verify the lack of duplicate entries in the list, the geographic area covered by the list, the number of list entries, and so forth, without simply giving the complete list to the buyer in useable form before the buyer pays for the complete list. Samples may be free, or they may be given in exchange for some item of value (e.g., cash, goods, services, or samples of other goods).

Similar steps could be taken with source code and other human-readable documents to make samples helpful to buyers without leaving sellers too vulnerable. Sampling 902 allows the prospective buyer to evaluate the credibility of the seller's claims about the digital goods without fully revealing the content of the goods and thereby making payment unnecessary if the buyer is not bound in fact by contract, copyright, ethics, or other constraints that encourage or ensure payment.

Care is preferably taken to prevent a seller S from intentionally providing damaged or incomplete goods by anticipating the sampling technique used to create X. For instance, suppose a mailing list is represented by the seller to contain several thousand different entries, but this is not actually the case. If the seller knows that samples of the list will be produced by extracting every fiftieth entry, then the seller can inflate the list to fifty times its valid size by repeating each valid entry an additional forty-nine times. Sampling will indicate that the list contains much more valid data than is actually the case. If the buyer and seller are in separate legal jurisdictions, are dealing with one another anonymously, or the buyer's legal and business recourse is otherwise limited, then the seller could gain an unfair advantage from the buyer's reliance on the sample.

To avoid this and similar situations, the seller should not know what sampling technique(s) will be used. It should also be difficult or impossible to reconstruct the original digital content from the sample if the sampling technique is not known, and in cases involving partial copies, even if the technique is known.

If the digital content includes photos, then the samples might be thumbnails, or "pixelated" (adjacent pixels averaged) images, or images that include only some color components or lack an alpha channel. Similar techniques for creating 1002 partial copies could be used with digital sounds, such as sampling at fixed intervals, or providing some but not all channels of a multi-channel digital audio recording.

To distort 1004 and/or burden 1106 the content during sampling, X could be watermarked or otherwise marked through steganographic techniques. Steps could also be taken to prevent use or reproduction of a sample X, such as using a Java applet to display X while preventing a copy of X from being made on buyer B's hard disk or printed. A copy of the original digital content could also be distorted 1004 by shifting colors in images, shifting frequency in images or sounds, adding noise to images or sounds or other content, or reordering the order of words or sentences in text.

Note that the sampling technique selection, like the application of the technique by Q, can be partially or fully automated. If a lookup of the filename extension, confirmation of a header signature or other pattern, or some other programmed test identifies the data type, automatic selection by Q can be used. Likewise, a given implementation of Q may be limited to a single data type, such as "ASCII prose" or "XML text" or "patent applications in Microsoft Word format". Alternately, the parties S and B may agree on a general class of sampling techniques and/or inform Q of the data type.

Tailoring the sampling technique to the type of digital content may be convenient in some cases, and critical in others. This depends in part on the categories used to define content types. For instance, an ASCII mailing list and an ASCII word processor file might both be categorized as "ASCII text", and sampling could be done by deleting every Nth (with N=3, 4, or 5, for example) character. Alternately, "mailing list in ASCII text form" and "documents other than mailing lists, in ASCII text form" might be separate data categories subject to different sampling techniques. For instance, the mailing list might be parsed and the sample be produced 1002 by deleting all the recipient names and numeric portions of street addresses while leaving the postal codes. Non-mailing list documents could still be sampled, very quickly and without significant parsing, by deleting every Nth character.

Content categories can be defined by defaults programmed into the broker Q, by definitions given by seller and/or buyer, or by a combination of these sources. File extensions, keywords, and other familiar indicators can be used to identify the formats of inputs to Q for sampling, and thus to identify in at least some cases the likely nature of the digital content and the type of sampling techniques to use.

Familiar techniques such as timestamps, checksums, secure digital envelopes, watermarks, and/or digital signatures can be used to permit buyers and/or sellers to authenticate the samples they receive, to ensure that the samples arrive intact as produced 902 by the broker. For instance, watermarks and/or digital signatures may be embedded in the sample (or equivalently, in a digital envelope containing the sample) as authentication information, thereby permitting authentication which verifies that the automatic broker tool is the source of the sample.

More generally, encryption, passwords, public keys, tokens, Secure Sockets Layer transmissions, and other familiar tools and techniques can be used to provide secure communications between the parties and the broker 504, and/or between the parties 500, 502 themselves, to protect samples, digital goods, payment information, and other data. Authentication may also be required of the seller and/or the buyer in some embodiments.

Note that in embodiments that use the broker 504 only to create the samples, the broker 504 might run at the seller's site, making an SSL or other secure network connection between broker and seller unnecessary. If the seller or an agent A will provide the samples to the buyer, then the broker 504 preferably digitally signs or watermarks the samples, to permit authentication of the broker 504 as the source of the samples.

To illustrate the sampling step 902 further, assume the following source code is part of the digital content which is offered for "sale" (that is, in an exchange for cash payment or for other goods or services) in a particular transaction:

flen: Integer;
Begin
With Database^.Tag_Ptr[Ptr]^,Database^ do
  Begin
  Fillchar(Tag_Line[1],80,' ');
  Tag_Line[0] := chr(80);
  If (length(Group)>0) and (length(Group)<5) then Move(Group[1],Tag_Line[2],length(Group));
If (length(Tag_Id)>0) and (length(Tag_Id)<11) then
  Move(Tag_Id[1],Tag_Line[7],length(Tag_Id));
If (length(Tag_Desc)>0) and (length(Tag_Desc)<31) then
  Move(Tag_Desc[1],Tag_Line[18],length(Tag_Desc));
If Cur_State in [0 . . . 16] then
Begin
Textcolor(Colors[Cur_State]);
Move(State[Cur_State],Tag_Line[49],6);
End;
End;
End;

Some sampling techniques create 1002 a sample X which is a partial copy of the original copy of the source code. In the following example, the sample is created 1002 by removing all array indices and any other characters that appear between matching square braces [ and ], so the sample X looks like this:
flen: Integer;
Begin
With Database^.Tag_Ptr[ ]^,Database^ do
  Begin
  Fillchar(Tag_Line[ ],80,' ');
  Tag_Line[ ] := chr (80);
  If (length(Group)>0) and (length(Group)<5) then
    Move(Group[ ],Tag_Line[ ],length(Group));
  If (length(Tag_Id)>0) and (length(Tag_Id)<11) then
    Move(Tag_Id[ ],Tag_Line[ ],length(Tag_Id));
  If (length(Tag_Desc)>0) and (length(Tag_Desc)<31) then
    Move(Tag_Desc[ ],Tag_Line[ ],length(Tag_Desc));
  If Cur_State in [ ] then
  Begin
  Textcolor(Colors[ ]);
  Move(State[ ],Tag_Line[ ],6);
  End;
  End;
End;

Some sampling techniques create a sample X which is a partial copy of the original copy of the source code and is also distorted 1004. In the following example, the sample is created by replacing every fifth character by the character "4" (that is, by distorting every fifth character into a "4") so the sample X looks like this:
flen4 Int4ger;4Begi4
Wit4 Dat4base4.Tag4Ptr[4tr]^4Data4ase^4do
  4egin4 Fil4char4Tag_4ine[4],804' ')4
  Ta4_Lin4[0] 4=ch4(80)4
  If4(len4th(G4oup)4̇0) a4d (l4ngth4Grou4)<5)4then4
Mo4e(Gr4up[14,Tag4Line42],l4ngth4Grou4));
4If (4engt4(Tag4Id)>4) an4 (le4gth(4ag_I4)<114 the4
  M4ve(T4g_Id41],T4g_Li4e[7]4leng4h(Ta4_Id)4;
I4 (le4gth(4ag_D4sc)>4) an4 (le4gth(4ag_D4sc)<41) t4en
4Move4Tag_4esc[4],Ta4_Lin4[18]4leng4h(Ta4_Des4));
4If C4r_St4te i4 [0.416] 4hen
4Beg4n
  4extc4lor(4olor4[Cur4Stat4]);
  4 Mov4(Sta4e[Cu4_Sta4e],T4g_Li4e[494,6);4 En4;
  E4d;
E4d;
Sampling techniques may sometimes be characterized in more than one way. For instance, the first sampling approach, which removed characters found between square brackets, could also be characterized as an approach that distorts the characters between square brackets into nonexistence.

Another sampling technique creates 1002, 1004 a sample X which is a partial and distorted copy of the original copy of the source code by replacing every other numeric character by the character "0", so the sample X looks like this:
flen: Integer;
Begin
With Database^.Tag_Ptr[Ptr]^,Database^ do
  Begin
  Fillchar(Tag_Line[1],00,' ');
  Tag Line[0] := chr(80);
  If (length(Group)>0) and (length(Group)<0) then
    Move(Group[1],Tag_Line[0],length(Group));
  If (length(Tag_Id)>0) and (length(Tag_Id)<01) then
    Move(Tag_Id[0],Tag Line[7],length(Tag_Id));
  If (length(Tag_Desc)>0) and (length(Tag_Desc)<30) then
    Move(Tag_Desc[1],Tag_Line[08],length(Tag_Desc));
  If Cur_State in [0 . . . 10] then
  Begin
  Textcolor(Colors[Cur_State]);
  Move(State[Cur_State],Tag_Line[40],6);
  End;
  End;
End;

Source code is just one example of digital content that can be sampled 902. Non-textual digital content can also be sampled, as when image pixels, image voxels, or discrete elements of a digital sound recording are omitted or distorted.

Figure 3:
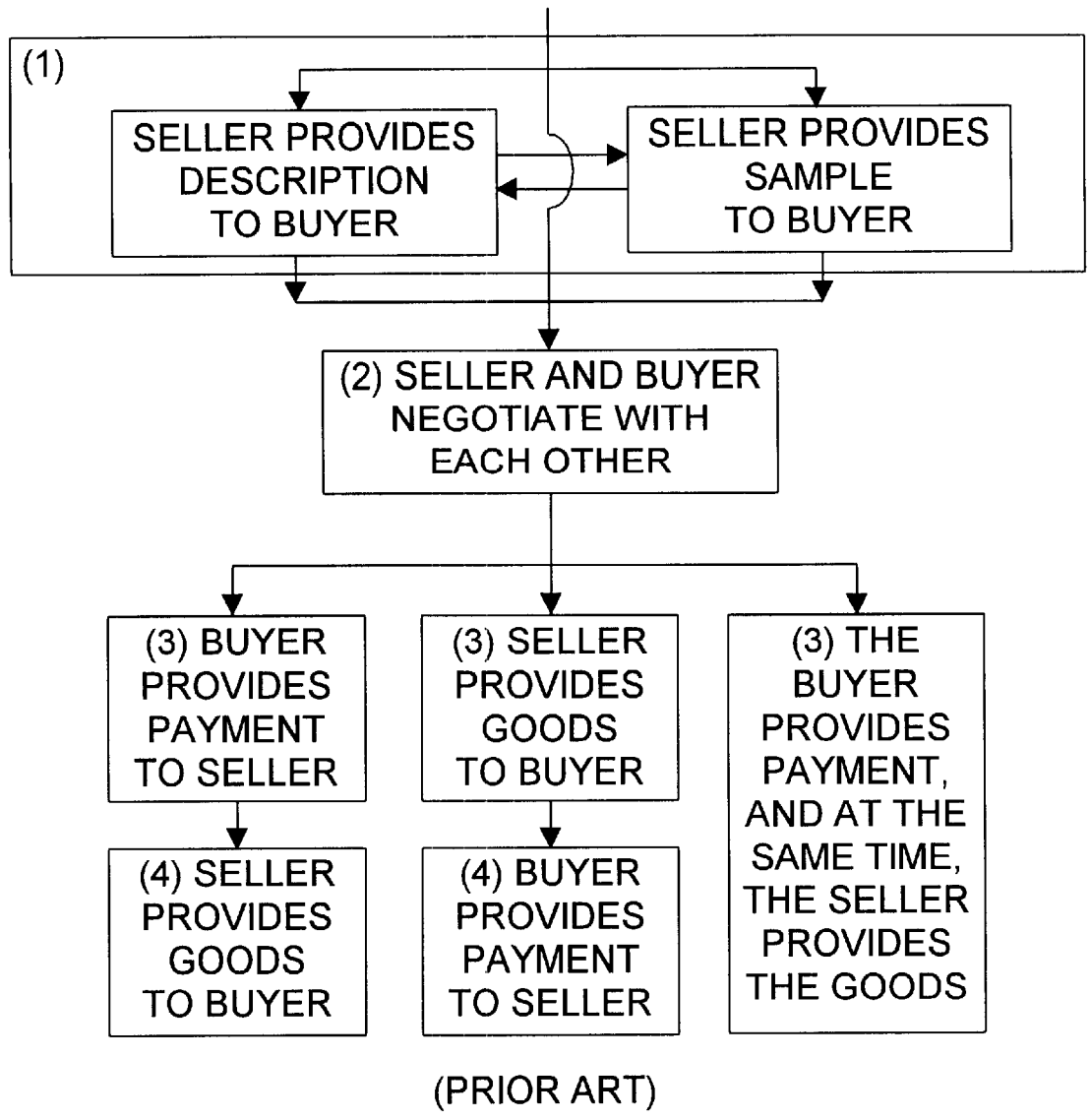
FIG. 3 is a flowchart illustrating prior art approaches to transactions involving digital and/or non-digital goods, including negotiations between seller and buyer, and showing alternatives in which the seller provides the goods and the buyer provides the payment in various orders.

As another example of digital content which is textual, but is not source code, consider the following excerpt from U.S. Pat. No. 3,999,789:

Bearing 100 supports the tailpiece driver 102 that extends from key lock 70. This tailpiece 102 thus extends through the matching opening in security dead bolt swivel 72, through bearing 100, through elongated vertical slot 98 of slide 90, through matching opening 96*a* in driven cam 96, and into a matching opening in turnpiece 68, all as shown in FIG. 3. Therefore, rotation of the cylinder lock and tailpiece 102 by a key 71 will rotate dead bolt swivel 72 to extend or retract dead bolt 58, depending upon the direction of rotation, and will also rotate cam 96 and turnpiece 68. Likewise, rotation of turnpiece 68 will rotate tailpiece 102 to rotate, i.e. pivot cam 96, and rotate dead bolt swivel 72. Tailpiece 102 in conventional fashion has a flat elongated configuration with a generally rectangular cross section, there being a corresponding cross section in the opening of swivel 72, and in opening 96*a* of cam 96 as well as the opening in turnpiece 68.

Like other technical texts or marketing texts, for instance, patent or patent application text can be sampled 902 in various ways. For instance, here is a partial copy of the excerpt given above, with every third sentence removed 1002 by sampling; omission locations are marked here for clarity of illustration but would not necessarily be marked in every sample:

<omitted> This tailpiece 102 thus extends through the matching opening in security dead bolt swivel 72, through bearing 100, through elongated vertical slot 98 of slide 90, through matching opening 96a in driven cam 96, and into a matching opening in turnpiece 68, all as shown in FIG. 3. Therefore, rotation of the cylinder lock and tailpiece 102 by a key 71 will rotate dead bolt swivel 72 to extend or retract dead bolt 58, depending upon the direction of rotation, and will also rotate cam 96 and turnpiece 68. <omitted> Tailpiece 102 in conventional fashion has a flat elongated configuration with a generally rectangular cross section, there being a corresponding cross section in the opening of swivel 72, and in opening 96a of cam 96 as well as the opening in turnpiece 68.

Alternatively, text could be sampled 902 to create a distorted and partial copy using a "dictionary scramble" technique. The text is at least partially scanned, and a dictionary of words used in the text is created. The selected words are placed in an order; this could be the order in which they were encountered, or alphabetic order. Then replacements are made in a copy, by substituting a second word in the list for a first word in the list each time the first word is encountered in the copy. The modified copy will be the sample.

In the example below, the dictionary listing used is "Bearing, 100, supports". In this example, two passes are made through the text, and during each pass each instance of a currently selected dictionary word is replaced by the word two positions further along in the dictionary list. Thus, instances of "Bearing" are replaced by "supports", and then instances of "100" are replaced by "Bearing":

Supports bearing supports the tailpiece driver 102 that extends from key lock 70. This tailpiece 102 thus extends through the matching opening in security dead bolt swivel 72, through supports bearing, through elongated vertical slot 98 of slide 90, through matching opening 96a in driven cam 96, and into a matching opening in turnpiece 68, all as shown in FIG. 3. Therefore, rotation of the cylinder lock and tailpiece 102 by a key 71 will rotate dead bolt swivel 72 to extend or retract dead bolt 58, depending upon the direction of rotation, and will also rotate cam 96 and turnpiece 68. Likewise, rotation of turnpiece 68 will rotate tailpiece 102 to rotate, i.e. pivot cam 96, and rotate dead bolt swivel 72. Tailpiece 102 in conventional fashion has a flat elongated configuration with a generally rectangular cross section, there being a corresponding cross section in the opening of swivel 72, and in opening 96a of cam 96 as well as the opening in turnpiece 68.

Of course, many other sampling techniques can also be used according to the present invention. For instance, the broker 504 could also scramble 1004 data to create a sample. Scrambling could mismatch names and addresses in a mailing list so that each name or address is individually correct but the names do not always match the indicated addresses. Similarly, scrambling could transpose entries in a table of numeric values, or it could change the order of statements in program source code. Scrambling and/or other distortions could be combined with omission, so that a portion of the data is first extracted and then distorted to create the sample.

The broker could also mix 1006 spurious data into a copy of the original digital content, such as by adding spurious addresses to a mailing list, adding spurious values to tables of data values, or adding spurious statements to source code. The presence of spurious data in maps, and of "bugs" in source code, has been used conventionally to show copyright infringement, but the use of such data according to the present invention to provide a digital sample 508 to facilitate commerce is believed to be novel.

For instance, spurious source code could be added 1006 by copying a loop or a function call, altering numeric parameters, and then inserting the resulting spurious code before or after the original code loop or function call. This technique has a good chance of breaking the sample's functionality to make it unsuitable for normal use as digital goods, as desired, without making the spurious addition easy to identify or remove. The modified code will usually still compile and link with the same error messages, or lack thereof, as it did before sampling 902.

Catalogs

Some embodiments provide a catalog containing samples according to the invention. This permits prospective buyers to inspect samples without making the sampled goods easily available for unauthorized use. Like conventional catalogs, catalogs according to the invention may contain text and/or pictures describing the offered products and services. The catalog may also contain samples of software that are conventional in the sense that they provide only a limited subset of functions (e.g., no print capability) and/or stop working after a previously specified number of uses or a previously specified period of time has passed. But the novel catalogs also have sampled 902 content according to the invention.

Systems and Devices

Figure 11:
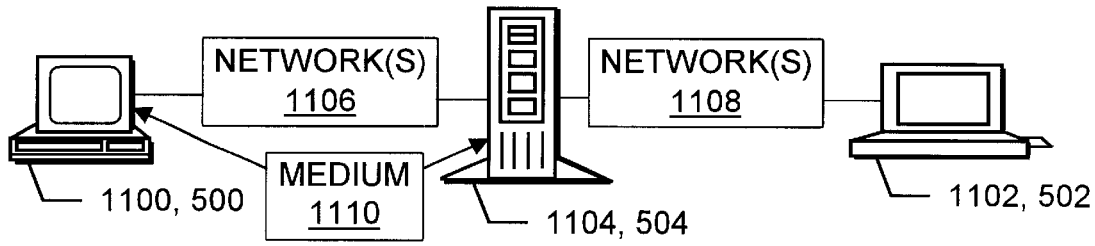
FIG. 11 is a diagram illustrating a configuration of computers and networks suitable for use according to the present invention.
Figure 12:
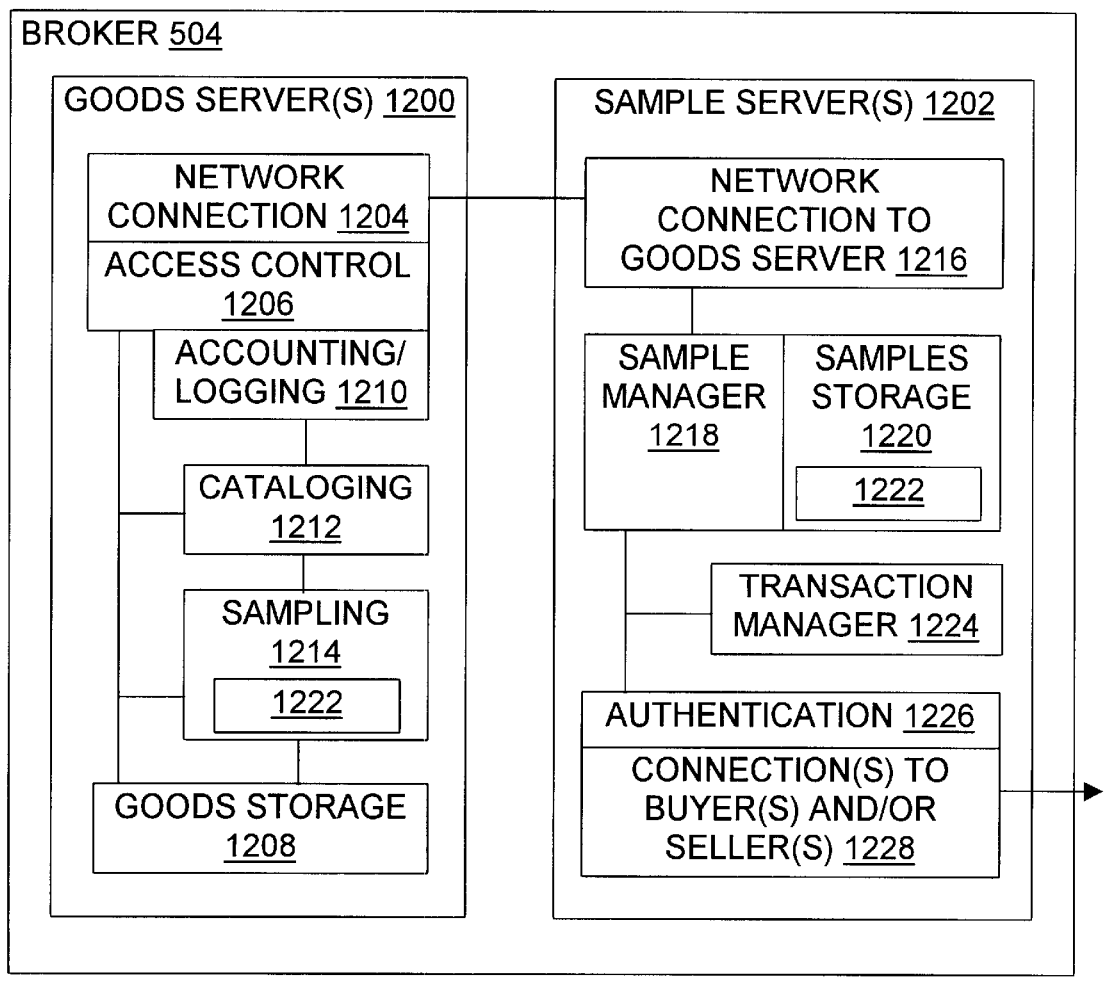
FIG. 12 is a diagram illustrating an architecture for an automatic broker according to the present invention.

FIGS. 11 and 12 illustrate some of the many possible configurations of systems and devices suitable for use according to the present invention. In FIG. 11, a seller computer 1100 and a buyer computer 1102 are each connected to a server 1104 that runs automatic broker 504 software. The seller connection 1106 and the buyer connection 1108 are not necessarily identical in bandwidth, latency, geographic scope, networking protocols, addressing, or other characteristics. Either or both connections 1106, 1108 may include local area network, Internet, or other network connections, including wired or wireless connections, intervening routers, servers, or other computers, telephone lines, and/or a combination of these and other familiar or yet-to-be-invented technologies for transmitting digital content. The illustrated configured storage medium 1110 is described in detail elsewhere herein.

FIG. 12 illustrates one of many possible embodiments of the broker 504; for completeness, FIG. 12 illustrates features that are not required in every embodiment.

In the illustrated embodiment, the broker 504 includes one or more goods servers 1200 and one or more sample servers 1202. Goods and samples are separated in this implementation for increased security, but may be combined in other embodiments, for faster response, increased ease of maintenance, or lower cost, for instance.

The servers may be implemented using physically separate (but networked) machines, or using logically separate server processes running on the same underlying computer hardware. In the case of separate machines, network connections 1204, 1216 permit communication between the machines. Suitable network connections include those known in the art.

An optional access control module 1206 controls access by the parties to a transaction (and by other entities) to a storage 1208 which contains escrowed digital goods. Operating system, file system, distributed directory, public key infrastructure, firewall, and/or other familiar access controls may be used to implement the access control module 1206. The storage 1208 may be implemented using disks, RAID systems, and/or other computer data storage media and devices.

An optional accounting/logging module 1210 performs accounting and/or logging operations. Logging uses familiar activity logging technology to maintain a log of the accesses granted or denied by the access control module 1206, the source and date on which goods were escrowed into the store 1208, transfers of digital content samples from the goods server 1200 to the sample server 1202, and/or other activity. The logs may be kept for enhanced security, to assist testing or debugging of the broker 504 software and/or hardware, or for other reasons. For instance, the logs may be used by accounting routines in the module 1210 to charge parties for escrow services, transactional activity, and/or sampling performed by the broker 504 for those parties.

An optional cataloging module 1212 creates catalogs, using novel samples according to the present invention. The catalogs may also contain conventional descriptions and samples of digital and/or non-digital goods, or services. Catalogs may take the form of one or more web pages (possibly with associated images and/or sounds), PDF or other integrated text-and-image files, multi-media presentations, or other formats for presenting digital content to prospects for purchase or a barter exchange.

An optional sampling module 1214 creates samples 1222 of digital content as discussed herein. The source digital content may be read from escrowed digital goods in the store 1208. Samples 1222 may also be created 902 "on-the-fly" by reading source content over the network connection(s) 1106, 1108, processing it (e.g., by 1004 distortion), and providing the resulting sample 1222 as output without escrowing the sampled goods.

In the illustrated embodiment, an optional sample manager 1218 stores and retrieves samples 1222 from a sample store 1220. The sample manager 1218 may also include access control, accounting, logging, and/or cataloging routines. The storage 1220 may be implemented using RAM, disks, RAID systems, and/or other computer data storage media and devices.

An optional transaction manager 1224 tracks the state and progress of a transaction. In some embodiments, the transaction is a goods-for-payment transaction of the types illustrated in one or more of FIGS. 5–7 and notation examples T4Q, T4Q', T5Q, T6Q, T7. In some embodiments, the transaction is a goods-for-goods barter transaction of the type illustrated in FIG. 8. In either case, the transaction manager 1224 includes routines and supporting hardware for steps such as authenticating parties, receiving and escrowing goods, obtaining and providing samples, obtaining and providing catalogs, receiving approvals and/or noting implicit approval by lack of cancellation after a specified time, releasing payments and/or goods to complete a transaction, and billing parties for services rendered. Which steps are present depends on the embodiment in question.

An authentication module 1226 and a network connection 1228 may also be present, to provide buyers with controlled access to samples 1222 from the sample store 1220. These modules may be implemented using the same or similar tools and techniques as those in the access control 1206 and other network connection 1204, 1216 components, respectively.

Conclusion

The invention provides methods, systems, and other embodiments for facilitating transactions involving digital content. Tools and techniques are provided for addressing various trust issues. Some of these issues are common to a wide variety of transactions, while other trust issues arise with particular strength in transactions that involve digital goods.

To address such issues, in some methods of the invention a seller 500 makes a copy of its digital content accessible to an automatic broker tool 504, which creates 902 a sample of the digital content. The sample's content is not predicted by the seller, so a buyer 502 can rely on the accuracy of the sample as an indicator of the nature and characteristics of the goods. The sample provides useful information about the digital content without giving the buyer 502 a complete and accurate copy of the digital content, so the seller 500 can make information about the goods available to the buyer 502 without thereby increasing the risk of unauthorized use of the goods.

The sample may be created 902 by distorting at least a portion of the digital content, by burdening at least a portion of the digital content with spurious data, by extracting a portion of the digital content and thereby omitting the remaining portion of the digital content, or by some combination of these steps. Authentication information may be placed in the sample as part of a burdening step 1006, thereby permitting authentication which verifies that the automatic broker tool 504 is the source of the sample. The sampling technique may selected by the automatic broker tool 504 in response to an identification (by the tool or by a user) of the data type of the digital content, e.g., "prose text" or "Microsoft Excel Database". The sample may be provided to the buyer 502 for inspection, may be provided to the seller 500, and/or may be placed in a catalog 904 of the seller.

In addition to providing samples, the automatic broker tool 504 may track the state of a transaction, accept goods for escrow 506, 800, note approvals 808, 810, release payments 510, and/or release goods 514, 812, 814. In completing a transaction, for instance, the broker 504 may release a copy of the digital content to at least one of the buyer 502 and an agent for the buyer, and may release a payment from the buyer to at least one of the seller 500 and an agent for the seller.

In some embodiments, an automatic broker tool 504 for facilitating transactions involving digital content includes a goods store 1208 for storing digital goods escrowed with the automatic broker tool, a sampling means (e.g., software/hardware implementing one or more of the steps 1002, 1004, 1006) in a module 1214 for creating a sample of digital goods, and a processor in a computer 1104 operable in connection with a configured memory of that computer to provide samples created by the sampling means and to escrow digital goods in the goods store. In one embodiment, the processor is also operable in connection with the configured memory to complete transactions by releasing 514 escrowed digital goods to a first party and releasing 512 a corresponding payment to a second party. In one embodiment, the processor is also operable in connection with the configured memory to complete transactions by releasing 814 escrowed digital goods of a first party to a second party and releasing 812 escrowed digital goods of the second party to the first party.

In some embodiments, an automatic broker tool 504 for facilitating barter transactions involving digital content includes the escrowed goods store 1208, and the digital goods are provided by at least two parties. The computer 1104 processor is operable in connection with the configured memory to escrow digital goods for the parties in the goods store 1208, to receive 808, 810 goods release approvals from the parties, and in response to those release approvals to complete a barter transaction by releasing 812, 814 escrowed goods to parties other than the parties that provided them to be escrowed. The broker may include a distorting sampling means for creating a sample by distorting 1004 a copy of at least a portion of the digital goods, such as by changing the order of data in the digital content. The broker may include a burdening sampling means for creating a sample by adding data to a copy of at least a portion of the digital goods, such as by adding steganographic data and/or spurious data to a copy of at least a portion of the digital goods.

A sample 1222 may be provided in the store 1220, from sampling module 1214 or as the result of a step 902. The sample 1222 of digital content may be produced according to the invention by a process for facilitating a transaction involving digital content possessed by a party (500, 502, or otherwise), the process comprising the steps of the party making a copy of the digital content accessible to an automatic broker tool 504, and the automatic broker tool creating 902 a sample of the digital content. The sample is characterized in that its content is not predicted by the party, whereby the sample contains useful information about the digital content without containing a complete and accurate copy of the digital content.

Some embodiments include a configured computer storage medium 1110 which will cause at least a portion of a computer system 1100, 1102, and/or 1104 to perform method steps for facilitating transactions involving digital content provided by a party, the method comprising the party making a copy of the digital content accessible to an automatic broker tool 504, and the automatic broker tool creating a sample 1222 of the digital content, the sample's content not predicted by the party as discussed above. In one method the party escrows the digital content with the automatic broker tool. In one method the broker creates the sample by distorting at least a portion of the digital content. In one method the broker creates the sample by burdening at least a portion of the digital content with spurious data.

Some configured computer storage medium 1110 embodiments will cause at least a portion of a computer system 1104 to perform method steps for facilitating barter transactions involving digital content, by receiving from a first party a copy of first digital content and escrowing that first digital content; receiving from a second party a copy of second digital content and escrowing that second digital content; determining an approval exists to release the first digital content to the second party; determining an approval exists to release the second digital content to the first party; releasing the first digital content to the second party; and releasing the second digital content to the first party.

Some configured computer storage medium 1110 embodiments will cause at least a portion of a computer system 1100, 1102, 1104 to perform method steps for facilitating transactions involving digital content, the digital content provided by a seller 500, by receiving from the seller a copy of digital content and escrowing that digital content, and creating 902 a sample of the digital content, including at least one of distorting a copy of at least a portion of the digital content and adding spurious data to a copy of at least a portion of the digital content. The sample creating step may place authentication information in the sample, thereby permitting authentication which verifies the source(s) of the sample.

In connection with a method for facilitating barter transactions using an automatic broker tool 504, one method of the invention includes the steps of obtaining a description of the automatic broker tool and employing the description by advertising at least one of the automatic broker tool and a barter transaction service which uses the automated broker tool. Similarly, in connection with a method for using sampling 902 to facilitate digital content transactions, another method of the invention includes the steps of obtaining a description of a configured computer storage medium 1110 and employing the description by advertising at least one of a configured computer storage medium and a service which uses the configured computer storage medium.

Although particular embodiments of the present invention are expressly illustrated and described individually herein, it will be appreciated that discussion of one type of embodiment also extends to other embodiment types. For instance, the description of the methods illustrated in FIGS. 5 through 10 also helps describe the systems and devices in FIGS. 11 and 12, and vice versa.

As used herein, terms such as "a" and "the" and designations such as "device", "item", and "step" are inclusive of one or more of the indicated element. In particular, in the claims a reference to an element generally means at least one such element is required.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for facilitating transactions involving digital content, the digital content provided by a seller, the method comprising the steps of:

the seller making a copy of the digital content for a transaction accessible to an automatic broker tool; and the automatic broker tool creating a sample of the digital content, the sample characterized in that its content is not predicted by the seller, whereby the sample contains useful information about the digital content without containing a complete and accurate copy of the digital content, thereby preventing an unauthorized use of the digital content.

2. The method of claim 1, wherein the broker creates the sample by distorting at least a portion of the digital content.

3. The method of claim 1, wherein the broker creates the sample by burdening at least a portion of the digital content with spurious data.

4. The method of claim 1, wherein the broker creates the sample by extracting a portion of the digital content and thereby omitting the remaining portion of the digital content.

5. The method of claim 1, further comprising the step of placing the sample in a catalog of the seller.

6. The method of claim 1, further comprising the step of the automatic broker tool providing the sample to the seller.

7. The method of claim 1, further comprising the step of the automatic broker tool providing the sample to a buyer for inspection.

8. The method of claim 7, further comprising the step of the automatic broker tool completing a transaction, the completing step comprising releasing a copy of the digital content to at least one of the buyer and an agent for the buyer.

9. The method of claim 8, wherein the automatic broker tool also releases a payment from the buyer to at least one of the seller and an agent for the seller while completing the transaction.

10. The method of claim 8, wherein the automatic broker tool also releases digital content from the buyer to the seller while completing the transaction.

11. The method of claim 1, wherein the step of creating a sample comprises placing authentication information in the sample, thereby permitting authentication which verifies that the automatic broker tool is the source of the sample.

12. The method of claim 1, wherein the automatic broker tool creates a sample using at least one technique which is selected by the automatic broker tool in response to identifying a data type of the digital content.

13. An automatic broker tool for facilitating transactions involving digital content, the tool comprising:
   a goods store for storing digital goods escrowed with the automatic broker tool;
   a sampling means for creating a sample of digital goods; and
   a processor operable in connection with a configured memory to provide samples created by the sampling means and to escrow digital goods in the goods store.

14. The automatic broker tool of claim 13, wherein the processor is also operable in connection with the configured memory to complete transactions by releasing escrowed digital goods to a first party and releasing a corresponding payment to a second party.

15. The automatic broker tool of claim 13, wherein the processor is also operable in connection with the configured memory to complete transactions by releasing escrowed digital goods of a first party to a second party and releasing escrowed digital goods of the second party to the first party.

16. An automatic broker tool for facilitating barter transactions involving digital content, the tool comprising:
   a goods store for storing digital goods to be escrowed, the digital goods provided to the automatic broker tool by at least two parties; and
   a processor operable in connection with a configured memory to automatically escrow digital goods for the parties in the goods store, to receive goods release approvals from the parties, and in response to those release approvals to automatically complete a barter transaction by releasing escrowed goods to parties other than the parties that provided them to be escrowed.

17. The automatic broker tool of claim 16, further comprising a distorting sampling means for creating a sample by distorting a copy of at least a portion of the digital goods.

18. The automatic broker tool of claim 17, wherein the distorting sampling means changes the order of data in the digital content.

19. The automatic broker tool of claim 16, further comprising a burdening sampling means for creating a sample by adding data to a copy of at least a portion of the digital goods.

20. The automatic broker tool of claim 19, wherein the burdening sampling means adds steganographic data to a copy of at least a portion of the digital goods.

21. The automatic broker tool of claim 19, wherein the burdening sampling means adds spurious data to a copy of at least a portion of the digital goods.

22. A sample of digital content produced by a process for facilitating a transaction involving digital content possessed by a party, the process comprising the steps of:
   the party making a copy of the digital content for a transaction accessible to an automatic broker tool; and
   the automatic broker tool creating a sample of the digital content, the sample characterized in that its content is not predicted by the party, whereby the sample contains useful information about the digital content without containing a complete and accurate copy of the digital content, thereby preventing an unauthorized use of the digital content.

23. A configured computer storage medium which will cause at least a portion of a computer system to perform method steps for facilitating transactions involving digital content, the digital content provided by a party, the method comprising the steps of:
   the party making a copy of the digital content for a transaction accessible to an automatic broker tool; and
   the automatic broker tool creating a sample of the digital content, the sample characterized in that its content is not predicted by the party, whereby the sample contains useful information about the digital content without containing a complete and accurate copy of the digital content, thereby preventing an unauthorized use of the digital content.

24. The configured computer storage medium of claim 23, wherein the method further comprises the step of the party escrowing the digital content with the automatic broker tool.

25. The configured computer storage medium of claim 23, wherein the broker creates the sample by distorting at least a portion of the digital content.

26. The configured computer storage medium of claim 23, wherein the broker creates the sample by burdening at least a portion of the digital content with spurious data.

27. A configured computer storage medium which will cause at least a portion of a computer system to perform method steps for facilitating barter transactions involving digital content, the digital content provided by at least two parties, the method comprising the computer-implemented steps of:
   receiving from a first party a copy of first digital content and escrowing that first digital content;
   receiving from a second party a copy of second digital content and escrowing that second digital content;
   determining an approval exists to release the first digital content to the second party;
   determining an approval exists to release the second digital content to the first party;
   releasing the first digital content to the second party; and
   releasing the second digital content to the first party.

28. The configured computer storage medium of claim 27, wherein at least one of the determining steps comprises receiving an approval from the party that provided the digital content being approved for release.

29. The configured computer storage medium of claim 27, wherein at least one of the determining steps comprises timing out after no cancellation is received from the party that provided the digital content being approved for release.

30. The configured computer storage medium of claim 27, wherein the method further comprises the steps of creating a sample of digital content; and sending the sample to at least one of the parties prior to at least one of the determining steps.

31. The configured computer storage medium of claim 27, wherein the digital content includes an image and the step of creating a sample creates a thumbnail of the image.

32. A configured computer storage medium which will cause at least a portion of a computer system to perform method steps for facilitating transactions involving digital content, the digital content provided by a seller, the method comprising the steps of:
   receiving from the seller a copy of digital content and escrowing that digital content; and
   creating a sample of the digital content, including at least one of distorting a copy of at least a portion of the digital content and adding spurious data to a copy of at least a portion of the digital content.

33. The configured computer storage medium of claim 32, wherein the sample creating step further comprises placing authentication information in the sample, thereby permitting authentication which verifies the source of the sample.

34. A method for facilitating barter transactions involving digital content using an automatic broker tool for facilitating barter transactions involving digital content, the tool comprising a goods store for storing digital goods to be escrowed, the digital goods provided to the automatic broker tool by at least two parties, the tool further comprising a processor operable in connection with a configured memory to escrow digital goods for the parties in the goods store, to receive goods release approvals from the parties, and in response to those release approvals to release escrowed goods to parties other than the parties that provided them to be escrowed, the method comprising the steps of obtaining a description of the automatic broker tool and employing the description by advertising at least one of the automatic broker tool and a barter transaction service which uses the automated broker tool.

35. A method for facilitating transactions involving digital content, the method comprising the steps of obtaining a description of a configured computer storage medium and employing the description by advertising at least one of a configured computer storage medium and a service which uses the configured computer storage medium, the computer storage medium configured to cause at least a portion of a computer system to perform steps in a process, the digital content provided by a party, the process comprising the party making a copy of the digital content for a transaction accessible to an automatic broker tool, the process further comprising the automatic broker tool creating a sample of the digital content, the sample characterized in that its content is not predicted by the party, whereby the sample contains useful information about the digital content without containing a complete and accurate copy of the digital content, thereby preventing an unauthorized use of the digital content.

\* \* \* \* \*